US012806471B2

(12) United States Patent
Cei

(10) Patent No.: US 12,806,471 B2
(45) Date of Patent: Nov. 24, 2026

(54) SYSTEM AND METHOD FOR IMPROVING THE TRAINING EXPERIENCE OF A USER

(71) Applicant: TECHNOGYM S.P.A., Cesena (IT)

(72) Inventor: Daniele Cei, Cesena (IT)

(73) Assignee: TECHNOGYM S.P.A., Cesena (IT)

( * ) Notice: Subject to any disclaimer, the term of this patent is extended or adjusted under 35 U.S.C. 154(b) by 373 days.

(21) Appl. No.: 18/146,978

(22) Filed: Dec. 27, 2022

(65) Prior Publication Data

US 2023/0201665 A1 Jun. 29, 2023

(30) Foreign Application Priority Data

Dec. 28, 2021 (IT) ........................ 102021000032783

(51) Int. Cl.
*A63B 24/00* (2006.01)
*G06V 40/16* (2022.01)

(52) U.S. Cl.
CPC ...... *A63B 24/0062* (2013.01); *A63B 24/0003* (2013.01); *G06V 40/172* (2022.01)

(58) Field of Classification Search
CPC ............ A63B 24/0062; A63B 24/0003; A63B 22/0076; A63B 22/02; A63B 22/0605; A63B 24/0087; G06V 40/172; G06V 20/52; G06V 40/23; G09B 19/0038
See application file for complete search history.

(56) References Cited

U.S. PATENT DOCUMENTS 10,960,266 B2 * 3/2021 Messinger ............. G06V 40/23
2011/0177914 A1 * 7/2011 Park .................. A63B 71/0622 482/54
2015/0335950 A1 11/2015 Eder
2017/0100637 A1 4/2017 Princen et al.
2021/0205660 A1 * 7/2021 Shavit .................... A63B 21/16

FOREIGN PATENT DOCUMENTS

CA 3146658 A1 1/2021
WO 2020/144835 A1 7/2020

OTHER PUBLICATIONS

Search Report for Italian Patent Application No. 102021000032783 (Aug. 18, 2022).

* cited by examiner

*Primary Examiner* — Megan Anderson
(74) *Attorney, Agent, or Firm* — Merchant & Gould P.C.

(57) ABSTRACT

A system for determining and storing identification data of a user and training data relating of the user in a training space, includes a central data processing unit; a central memory unit; an image acquisition device; an exercise machine; and an exercise tool free from an actuator operable during physical exercise. The image acquisition device acquires identification images of the user, images representative of the user while performing a bodyweight physical exercise, images representative of the user and of the exercise machine while performing a physical exercise using the exercise machine, images representative of the user and of the exercise tool while performing a physical exercise using the exercise tool. Identification data and training data of the user is determined based on the images acquired by the image acquisition device. The device stores the determined identification data and training data inside the training space in the central memory unit.

23 Claims, 13 Drawing Sheets

SYSTEM AND METHOD FOR IMPROVING THE TRAINING EXPERIENCE OF A USER

CROSS-REFERENCE TO RELATED APPLICATION

This application claims the benefit of Serial No. 102021000032783, filed 28 Dec. 2021 in Italy, and which application is incorporated herein by reference. To the extent appropriate, a claim of priority is made to the above-disclosed application.

FIELD OF THE INVENTION

The present invention relates to the fitness field, and in particular, to a system and a related method for improving the training experience of a user.

TECHNOLOGICAL BACKGROUND OF THE INVENTION

The tracking of user or user training data is a very important aspect for improving the training experience of the user.

In fact, the data of a user and of a training being performed or performed by a user on an exercise machine, on which the user had authenticated to perform the assigned training program, are stored, for example, in a remote electronic computer or cloud, so as to update the profile of the user and, at a subsequent authentication of the user on an exercise machine, allow the user to continue the training program resuming from the last stored profile, and/or a personal trainer, given the results obtained so far by the user, to modify the training program of the user.

It is apparent that the traceability and storage of user training data are facilitated by the fact that an exercise machine is remotely connected to the remote electronic computer or cloud and by the fact that the user, before starting the training on a specific exercise machine, authenticates in advance so as to set the profile thereof and the respective training program.

However, a user, within a training program, can perform not only exercises which involve the use of one or more exercise machines but also or exclusively bodyweight exercises and/or exercises which involve the use of more simple equipment, such as weights, kettlebells, dumbbells, and so on, which obviously could not allow a connection to the remote electronic computer, nor a user authentication.

In this case, the user would have to upload the exercises performed by hand via an electronic device connected to the remote electronic computer, with a waste of time and considerable difficulty in remembering all the exercises performed.

All this limits the traceability and storage of user and user training data which would therefore risk not corresponding to the actual physical activity performed, therefore being outdated and unreliable for improving the training experience of the user.

In the light of this, expressly to improve the training experience of a user as much as possible, the need is strongly felt to be able to determine, and therefore to track, and store the user data and the data relating to the training performed by a user during any exercise performed by a user, whether on or with an exercise machine, a bodyweight exercise or using any other equipment available so as to be able to track and store user and user training data which are as complete as possible.

SUMMARY

It is the object of the present invention to devise and provide a system for determining and storing identification data of a user and respective data relating to a training of the user in a training space which allows at least partially obviating the abovementioned drawbacks with reference to the prior art, in particular which is capable of performing such operations during any exercise performed by a user, whether on or with an exercise machine, a bodyweight exercise or using any other equipment available so as to be able to track and store user and user training data which are as complete as possible.

Such an object is achieved by a system for determining and storing identification data of a user and respective data relating to a training of the user in a training space, comprising:

- at least one central data processing unit;
- at least one central memory unit operatively connected to said at least one data processing unit;
- at least one image acquisition device present inside the training space and operatively connected to the at least one central data processing unit, said at least one image acquisition device being configured to communicate data with the at least one central data processing unit;
- at least one exercise machine present inside the training space, the at least one exercise machine being operatively connected to the at least one central data processing unit, the at least one exercise machine being configured to communicate data to the at least one central data processing unit, the at least one exercise machine comprising at least one actuator which is operable while performing the physical exercise;
- at least one exercise tool present inside the training space, said at least one exercise tool being free from any actuator which is operable while performing a physical exercise;
- said atleast one image acquisition device being configured to acquire identification images of the user in the training space, images representative of the user while performing a bodyweight physical exercise in the training space, images representative of the user and of the at least one exercise machine while performing a physical exercise using said at least one exercise machine, images representative of the user and of the at least one exercise tool while performing a physical exercise performed by the user using said at least one exercise tool,
- the at least one central data processing unit being configured to determine identification data of the user and training data of the user inside the training space based on the images acquired by said at least one image acquisition device,
- the at least one central data processing unit being configured to store the determined identification data of the user and training data of the user inside the training space in the at least one central memory unit of the system operatively connected to the at least one central data processing unit.

The present invention also relates to a method for determining and storing identification data of a user and respective data relating to the training of the user in a training space, comprising steps of:

- acquiring, by at least one image acquisition device present inside the training space and operatively connected to at least one central data processing unit, identification images of the user in the training space, the at least one image acquisition device being configured to communicate data with the at least one central data processing unit;

acquiring, by the at least one image acquisition device, images representative of the user while performing a bodyweight physical exercise in the training space;

acquiring, by the at least one image acquisition device, images representative of the user and of at least one exercise machine present inside the training space, while performing a physical exercise using said at least one exercise machine, the at least one exercise machine being operatively connected to the at least one central data processing unit, the at least one exercise machine being configured to communicate data to the at least one central data processing unit, the at least one exercise machine comprising at least one actuator which is operable while performing the physical exercise;

acquiring, by the at least one image acquisition device, images representative of the user and of at least one exercise tool while performing a physical exercise performed by the user using said at least one exercise tool, the at least one exercise tool being free from any actuator which is operable while performing a physical exercise;

determining, by the at least one central data processing unit, identification data of the user and training data of the user inside the training space based on the images acquired by said at least one image acquisition device;

storing, by the at least one central data processing unit, the determined identification data of the user and training data of the user inside the training space in at least one central memory unit operatively connected to the at least one central data processing unit.

BRIEF DESCRIPTION OF THE DRAWINGS

Further features and advantages of the system and the related method according to the invention will become apparent from the following description of preferred embodiments thereof, given by way of indicative, non-limiting examples, with reference to the accompanying drawings, in which.

It should be noted that, in the aforesaid figures, equivalent or similar elements are indicated by the same numeric and/or alphanumeric reference.

DETAILED DESCRIPTION

Figure 1:
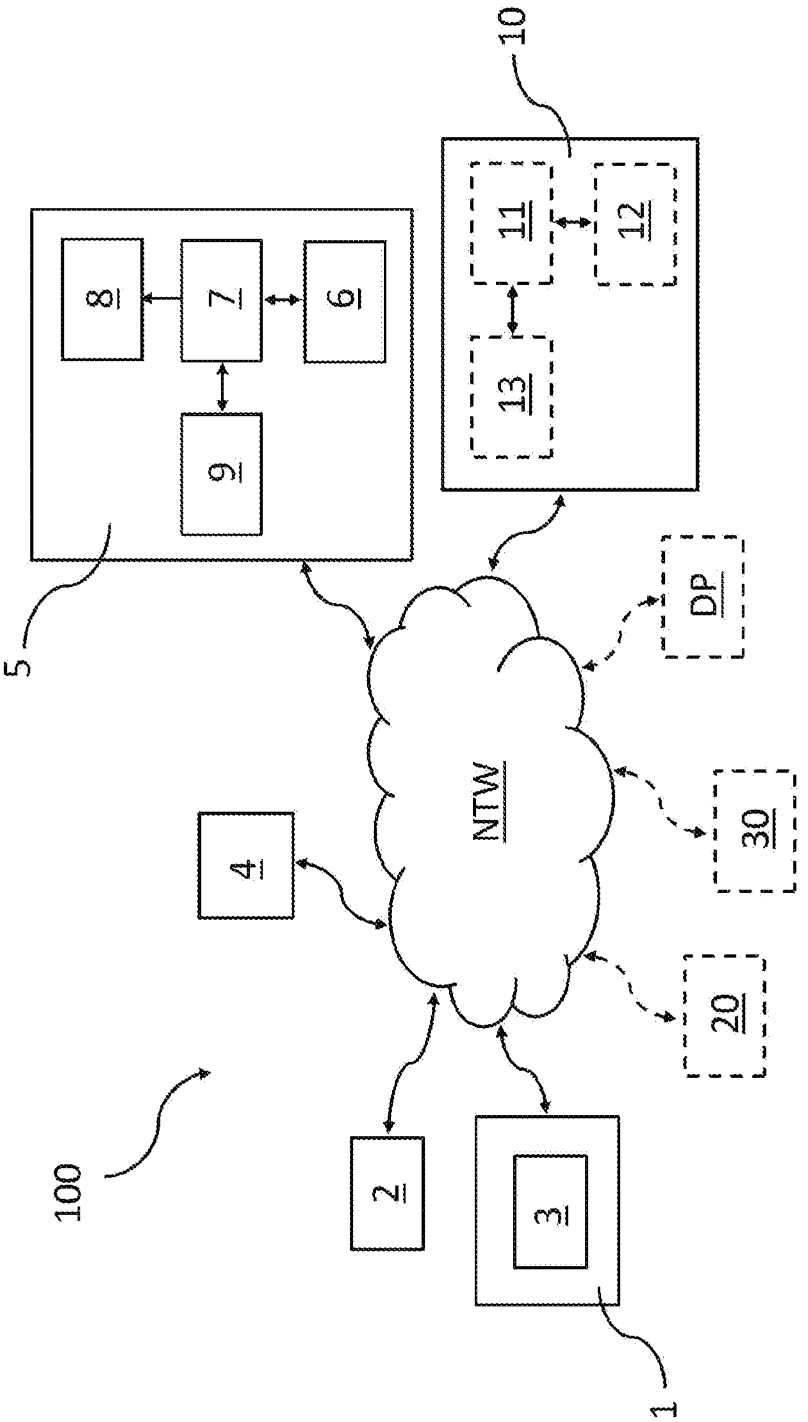
FIG. 1 shows, by means of a block diagram, a system for determining and storing identification data of a user and respective training data of the user in a training space, in accordance with the present invention.

With reference to the aforesaid figures, a system 100 for determining and storing identification data of a user and respective training data of the user in a training space is described, hereinafter also referred to as a system for determining and storing data only or simply a system, in accordance with the present invention.

"Training space" means any indoor or outdoor space, comprising one or more areas separated from one another by walls or other similar separation elements and communicating with one another by means of doors or other equivalent access elements, in which a user can train, in which one or more of the electronic components included in the system 100, described below, are present or can be reached.

Examples of a training space are an indoor (as in FIG. 1) or outdoor gym, an outdoor space, an indoor home space, an outdoor home space (for example, a balcony, a terrace, a courtyard), and so on.

"Identification data of a user" means data being usable by the system 100 to identify the user, for example, data being obtainable from a code associated with the user (for example, a label or a tag associated with a garment, a color of a garment or of a bracelet), data being obtainable from a portable electronic device wearable by the user (of the wearable type), data being obtainable from a facial recognition of the user or from a recognition of the biometric parameters of the user (proportions of the lower limbs, upper limbs, torso, and others), and so on.

The identification data of the user U comprise information on the identity of the user U which, for privacy reasons, cannot be attributable to the user U.

"Training data of the user" means data representative of a physical exercise performed by the user U inside the training space A such as, for example, data relating to the movement of the user during the physical exercise (for example, posture during a run or when pedaling, and so on), operating parameters of an exercise machine used by the user to perform the physical exercise; data relating to the movement of the exercise machine, or parts thereof, used by the user to perform the physical exercise (for example, even if associable with the data relating to the movement of the user, movement of the levers of an elliptical machine, movement of a handle of a rower, movement of the levers of a strength machine, movement of a weight stack of a strength machine, and so on); data relating to an exercise tool (for example, weight, shape, color, and so on); data relating to the movement of an exercise tool (for example, even if associable with the movements of the user, for example, data relating to the movement of a weight, a dumbbell, a barbell, a kettlebell, and so on).

A definition of "exercise machine" and a definition of "exercise tool" will be provided below.

"Determining and storing identification data of a user and respective data relating to a training of the user in a training space" means the detection and/or traceability and/or calculation and subsequent storage of the aforesaid data during the stay of a user inside the training space.

With particular reference to FIG. 1, the system 100 comprises at least one central data processing unit 1, for example a microcontroller or a microprocessor.

The system 100 further comprises at least one central memory unit 2 operatively connected to the at least one central data processing unit 1.

The at least one central data processing unit 1 is configured to load and execute one or more program codes (previously stored in a respective local memory unit 3, diagrammatically shown in FIG. 1) to perform respective functions including determining and storing identification data of a user and respective data relating to a training of the user in a training space A, as it will be described below.

It should be noted that the system 100 can comprise one or more central data processing units 1, and one or more respective central memory units 2, so as to be capable of carrying out the respective functions, depending on the configuration, totally locally, i.e., inside the training space A, totally remotely with respect to the training space A, or in a hybrid mode, i.e., with functions to be carried out locally and functions to be carried out remotely, with respect to the training space A.

With reference again to FIG. 1, the system 100 further comprises at least one image acquisition device 4 present inside the training space A and operatively connected to at least one central data processing unit 1.

The at least one image acquisition device 4 is configured to communicate data with the at least one central data processing unit 1.

The at least one image acquisition device 4 can be any electronic device which allows acquiring digital images and/or digital videos inside the training space A, whether it is a gym (indoor or outdoor gym) or a home space (indoor or outdoor home space).

Examples of image acquisition devices are a 2D digital camera, a 3D digital camera, an RGB camera, an RGB-D camera, a video camera, a depth camera, a Time-Of-Flight (TOF) camera, a webcam, a thermal camera, a motorized camera, and so on.

The image acquisition device can have specific technical features including resolution (for example: 5 MP, 8 MP, 16 MP, 1080p, 4K or else), focal length (for example: wide angle, short telephoto, medium telephoto, super telephoto or else), aperture range (for example: f/1.8, f/4, f/16 or else), field of view FoV (for example: 90°, 120°, 180° or else), aspect ratio (for example: square, portrait, landscape, panoramic or else), frame ratio (for example: 30 fps, 50 fps, 60 fps or else), type of focus (for example: auto-focus, manual focus, fixed focus or else), installation type (integrated, built in, embedded, standalone).

It should be noted that, "image acquisition device present inside the training space A" means that the at least one image acquisition device 4 is available inside the training space A so that it can acquire images of the user during the stay thereof inside the training space A.

Figure 3:
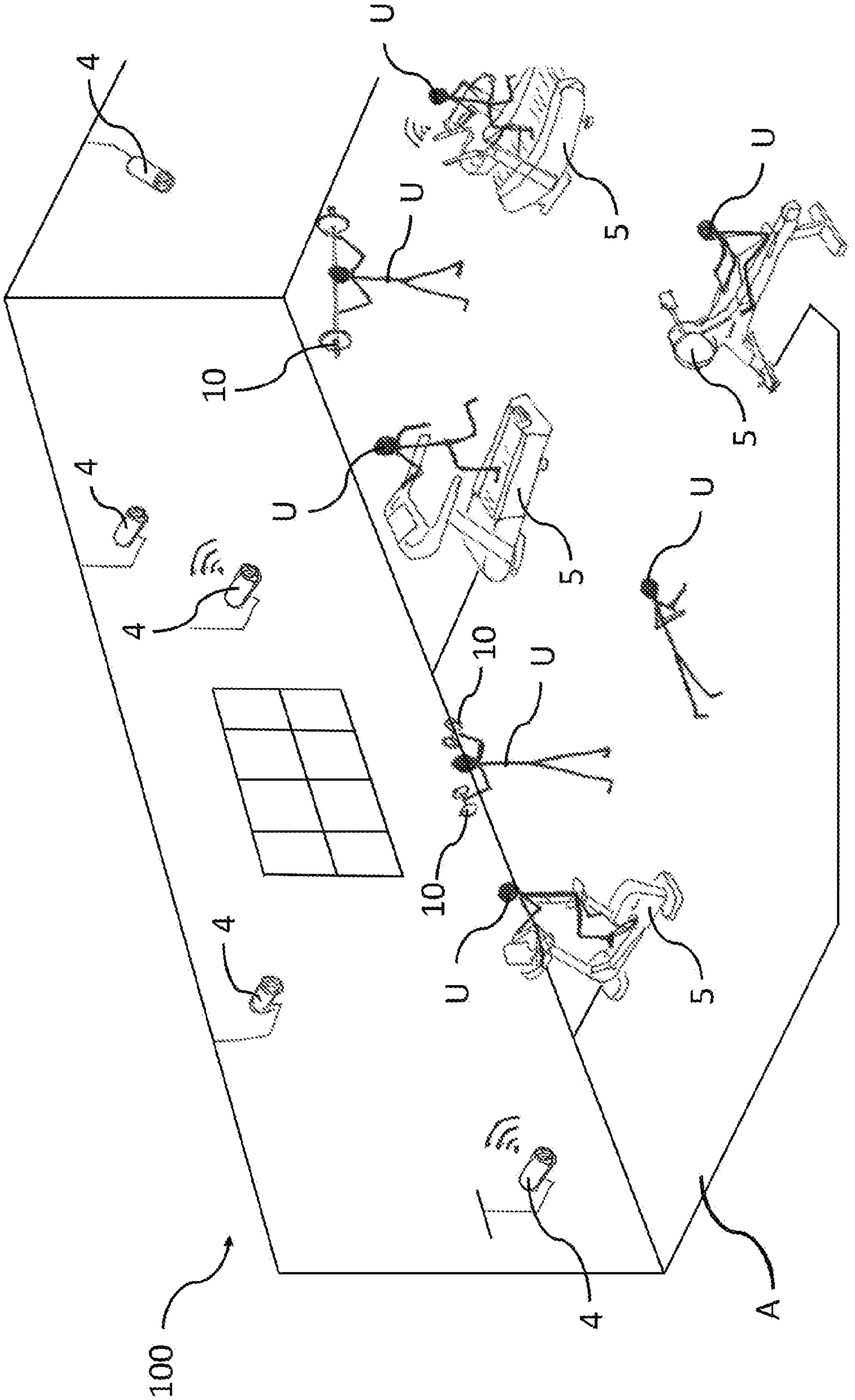
FIG. 3 diagrammatically shows the system in FIG. 1 in accordance with an embodiment of the invention.

In an embodiment, in combination with the preceding ones and shown, for example, in FIG. 3, the system 100 can comprise a plurality of image acquisition devices 4, completely similar to the at least one image acquisition device 4 described above.

The presence of more than one image acquisition device 4 advantageously allows the system 100 to better follow a user inside the training space A, being thus able to improve the reliability and accuracy of the system 100 itself.

The more general case in which the system 100 comprises said at least one image acquisition device 4 can certainly relate to when the training space A is the gym, but above all when the training space A is the home space, where it is more likely that only one of the aforesaid devices is present.

With reference again to FIG. 1, the system 100 further comprises at least one exercise machine 5 present inside the training space A.

For the purposes of the present invention, "exercise machine" means any exercise machine comprising at least one actuator (motor and/or brake) which is operable (automatically or manually) while performing the physical exercise such as, for example, a treadmill, a bike, a rower, a strength machine with automatic parameter detection.

Note that examples of treadmill, bike and rower are diagrammatically shown and indistinctly indicated with reference numeral 5 in FIG. 3 (two treadmills, one bike and one rower) and in FIGS. **4*a*-4*d*** (two treadmills).

"Exercise machine present inside the training space" means that the exercise machine is in a position such that the at least one image acquisition device 4 (or the plurality of image acquisition devices) can acquire an image thereof.

The at least one exercise machine 5 is operatively connected to the at least one central data processing unit 1.

According to different embodiments, the at least one exercise s machine 5 is operatively connected to the at least one central data processing unit 1 in a wired or wireless mode.

In an embodiment, diagrammatically shown in FIG. 2, the at least one exercise machine 5 is operatively connected to the at least one central data processing unit 1 by means of a data communication network NTW, for example, the Internet, diagrammatically shown in FIG. 2.

In greater detail, the data communication network NTW can be a local network, for example a local area network (LAN), or a telecommunications network which extends over a large geographical distance, for example a Wide Area Network (WAN) or a combination of one or more of the aforesaid types.

In a further embodiment, alternatively or in combination with the preceding one, the at least one exercise machine 5 is operatively connected to the at least one central data processing unit 1 in a wireless mode by means of a wireless technology data communication channel such as, for example, a Wi-Fi, Bluetooth, NFC data communication channel, and so on.

With reference again, in general, to the at least one exercise machine 5, the at least one exercise machine 5 is configured to communicate data with the at least one central data processing unit 1.

In accordance with different embodiments, the data communication between the at least one exercise machine 5 and the at least one central data processing unit 1 can occur by means of the data communication network NTW and/or a wireless technology data communication channel (Wi-Fi, Bluetooth, NFC, and so on).

With reference again, in general, to at least one exercise machine 5, it comprises at least one actuator 6 which is operable while performing the physical exercise.

The at least one actuator 6 is, for example, an electric motor and/or a brake device being operable (automatically or manually by the user) while performing the physical exercise.

Still with reference to FIG. 1, the at least one exercise machine 5 further comprises at least one respective local data processing unit 7.

The at least one actuator 6 is operatively connected to the at least one local data processing unit 7.

Furthermore, the at least one exercise machine 5 further comprises at least one local memory unit 8 operatively connected to said at least one local data processing unit 7.

The at least one local memory unit 8 can be internal or external (as shown, for example, in FIG. 2) with respect to the at least one local data processing unit 7.

It should be noted that the at least one local memory unit 8 is configured to store one or more program codes executable by the at least one local data processing unit 7 to generally control the at least one exercise machine 5 and, specifically, to perform respective functions provided within the operation of the system 100, as it will be described below.

Still with reference to FIG. 1, the at least one exercise machine 5 further comprises a data communication unit 9.

The at least one exercise machine 5, in particular the at least one local data processing unit 7, is configured to communicate data to the at least one central data processing unit 1 by means of the data communication module 9.

In accordance with different embodiments, the data communication module 9 is configured to communicate data by means of the data communication network NTW and/or by means of a wireless technology data communication channel (Wi-Fi, Bluetooth, NFC, and so on).

In an embodiment, in combination with the preceding ones and shown, for example, in FIG. 3, the system 100 can comprise a plurality of exercise machines 5, entirely similar, from a functional point of view, to the at least one exercise machine 5 described above with particular reference to FIG. 1.

The more general case in which the system 100 comprises said at least one exercise machine 5 can certainly relate to when the training space A is the gym, but also to when the training space A is the home space, where it is more likely that only one of the aforesaid exercise machines is present.

With reference again, in general, to the system 100 and to FIG. 1, it comprises at least one exercise tool 10 present inside the training space A.

The at least one exercise tool 10 is free from any actuator which is operable while performing a physical exercise.

"Exercise tool" precisely means any exercise tool free from any actuator (for example, motor and/or brake) which is operable (automatically or manually by the user) while performing a physical exercise such as, for example, a barbell, a dumbbell, a kettlebell, an elastic band, parallel bars, a strength tool with weight stack, a strength tool with disc holder levers (of the "plate loaded" type).

It should be noted that FIG. 1 shows a barbell and a pair of dumbbells, all indicated with reference numeral 10.

"Exercise tool present inside the training space" means that the exercise tool is in a position such that the at least one image acquisition device 4 (or the plurality of image acquisition devices) can acquire an image thereof.

The at least one exercise tool 10 is configured to be recognized if acquired within an image, for example, by means of the respective shape, color or a respective identification tag.

The at least one exercise tool 10 is characterized by one or more parameters representative of said at least one exercise tool 10.

Examples of such parameters are weight, spring constant or else, depending on the exercise tool 10.

In an embodiment, the at least one exercise tool 10 is operatively connected to the at least one central data processing unit 1.

In accordance with an embodiment, the at least one exercise tool 10 is operatively connected to the at least one central data processing unit 1 in a wireless mode.

In an embodiment, the at least one exercise tool 10 is operatively connected to the at least one central data processing unit 1 by means of the data communication network NTW already described above.

In a further embodiment, alternatively or in combination with the preceding one, the at least one exercise tool 10 is operatively connected to the at least one central data processing unit 1 in a wireless mode by means of a wireless technology data communication channel such as, for example, a Wi-Fi, Bluetooth, NFC data communication channel, and so on.

In an embodiment, the at least one exercise tool 10 is configured to s communicate data with the at least one central data processing unit 1.

In accordance with different embodiments, the data communication between the at least one exercise tool 10 and the at least one central data processing unit 1 can occur by means of the data communication network NTW and/or a wireless technology data communication channel (Wi-Fi, Bluetooth, NFC, and so on).

In an embodiment, shown with dashed lines in FIG. 2, the at least one exercise tool 10 comprises at least one local data processing module 11, for example a microprocessor or a microcontroller.

The at least one exercise tool 10 further comprises at least one local memory module 12 operatively connected to said at least one local data processing module 11.

The at least one local memory module 12 can be internal or external (as shown, for example, in FIG. 2) with respect to the at least one local data processing module 11.

It should be noted that the at least one local memory module 12 is configured to store one or more program codes executable by the at least one local data processing module 11 to perform respective functions during the use of the at least one exercise tool 10, even during the operation of the system 100.

In an embodiment, in combination with the preceding one and shown with dashed lines in FIG. 1, the at least one exercise tool 10 further comprises a local data communication module 13 operatively connected to the at least one local data processing module 11.

The at least one exercise tool 10, in particular the at least one local data processing module 11, is configured to communicate data to the at least one central data processing unit 1 by means of the local data communication module 13.

In accordance with different embodiments, the local data communication module 13 is configured to communicate data by means of the data communication network NTW and/or by means of a wireless technology data communication channel (Wi-Fi, Bluetooth, NFC, and so on).

In an embodiment, alternatively to the preceding ones, the at least one exercise tool 10 has no configuration for communicating data with the at least one central data processing unit 1.

In this embodiment, the at least one exercise tool 10 is free from said local data communication module 13.

In an embodiment, in combination with the preceding ones and shown, for example, in FIG. 3, the system 100 can comprise a plurality of exercise tools 10, entirely similar, from a functional point of view, to the at least one exercise tool 10 described above with particular reference to FIG. 2.

The more general case in which the system 100 comprises said at least one exercise tool 10 can certainly relate to when the training space A is the gym, but also to when the training space A is the home space.

In a further embodiment, shown with dashed lines in FIG. 1, the system 100 further comprises a personal device DP which is wearable by the user U.

The personal device DP wearable by the user U is acquirable as an image by the at least one image acquisition device 4 and/or connectable in a wireless mode to the at least one central data processing unit 1 and/or the at least one image acquisition device 4, during the presence of the user U in the training space A.

Examples of a personal device which is wearable by the user U are a bracelet, a wristband, a band, a smartphone, a smartwatch, or another electronic device which is wearable by the user U, and so on.

With reference again, in general, to the system 100 in accordance with the present invention, the at least one image acquisition device 4 is configured to acquire identification images of the user U in the training space A.

Furthermore, the at least one image acquisition device 4 is configured to acquire images representative of the user U while performing a bodyweight physical exercise in the training space A.

Again, the at least one image acquisition device 4 is configured to acquire images representative of the user U and of the at least one exercise machine 5 while performing a physical exercise using said at least one exercise machine 5.

In addition, the at least one image acquisition device 4 is configured to acquire images representative of the user U and of the at least one exercise tool 10 while performing a physical exercise performed by the user U using said at least one exercise tool 10.

The at least one central data processing unit 1 is configured to determine identification data of the user U and training data of the user U inside the training space A determined based on the images acquired by said at least one image acquisition device 4.

In this respect, the at least one central data processing unit 1 is configured to perform such a determination by using a set motion tracking algorithm which in turn uses computer vision techniques, artificial intelligence algorithms, and so on.

By way of example, the at least one data processing unit 1, using artificial intelligence algorithms, is configured to recognize and classify the physical exercise performed by the user, count the repetitions performed by the user, count the series performed by the user, assess the pace of the user, assess the range of motion (ROM), analyze the posture of the user while performing the exercise, segment the body of the user, recognize the body of the user, recognize the gestures of the user, recognize the face of the user (facial recognition), detect the movement of the user, detect the heart rate of the user, detect the fatigue felt by the user, detect the gender and/or race of the user, analyze the body mass index (BMI).

Examples of artificial intelligence algorithms can be Ordinary Least-Squares Regression (OLS), Multiple Linear Regression (MLR), Principal Component Regression (PCR), Partial Least-Squares Regression (PLS), Ridge regression (RR), Lasso Regression, Multivariate Adaptive Regression Splines (MARS), Stepwise Regression (SR), Nonlinear Regression, and many others.

In addition, classification techniques can also be used such as, for example, linear discriminant analysis (LDA), logistic regression (LR), classification and regression trees (CART), Gaussian mixture models (GMMs), k-nearest neighbors (k-NNs), artificial neural networks (ANNs), deep neural networks (DNNs), convolutional neural networks (CNNs), support vector machines (SVMs), partial least-squares-discriminant analysis (PLS-DA), multilayer perceptron classifiers (MLPs), radial basis functions (RBFs), and so on.

It should be noted that the techniques described above are usable by at least one central data processing unit 1 to perform other functions, described below in accordance with various embodiments, provided in the implementation of the system 100.

With reference again, in general, to the system 100, the at least one central data processing unit 1 is configured to store the determined identification data of the user U and training data of the user U inside the training space A in the at least one central memory unit 2 of the system 100 operatively connected to the at least one central data processing unit 1.

In accordance with an embodiment, the at least one image acquisition device 4 is configured to provide the at least one central data processing unit 1 with the acquired images.

In accordance with an embodiment, in combination with any of the preceding ones, the at least one central data processing unit 1 is configured to assign an identification code of the user U to the user U.

The identification code of the user U comprises the identification data of the user U.

In an embodiment, in combination with the preceding one, the at least one central data processing unit 1 is configured to recognize the user U from the acquired identification images of the user U, and use the assigned identification code of the user U (therefore not the acquired images and/or the biometric data) to determine the data of the user U during the presence inside the training space A in association with the identification data of the user U included in the identification code of the user U.

Techniques for recognizing the user (face and/or body) have been described above.

As for the assignment to the user of the respective identification code of the user U, in an embodiment, the at least one central data processing unit 1 is configured to determine a schematic reference model (skeleton or body outline) representative of the user U, from a processing of first identification images of the user U acquired during an initial authentication step (by acquiring an image of the face and/or body) of the user U.

Such a schematic reference model comprises a plurality of key elements (for example, nodes and/or anatomical segments) with which to uniquely represent the user U.

In this embodiment, the at least one central data processing unit 1 is configured to store such a schematic reference model in the at least one central memory unit 2.

In this embodiment, the at least one central data processing unit 1 is configured to generate the respective identification code of the user U, for example, a string of alphanumeric characters and/or symbols, based on such a processing.

In accordance with a second embodiment, alternatively to the preceding one, in which the system 100 comprises the personal device DP (described above) being wearable by the user U, the at least one central data processing unit 1 is configured to acquire the identification code of the user U from the personal device DP being wearable by the user U.

In accordance with an embodiment, in combination with any of the preceding ones, the at least one central data processing unit 1 is configured to recognize the face of the user U from an identification image of the user U acquired by the at least one image acquisition device 4.

In greater detail, the at least one central data processing unit 1 is configured to compare the identification image of the user U acquired by the at least one image acquisition device 4 with the schematic reference model (described above) stored in the at least one central memory unit 2.

In accordance with an embodiment, in combination with any of the preceding ones, the at least one central data processing unit 1 is configured to determine information representative of the posture of and/or movements performed by the user U from said images representative of the user U while performing a physical exercise using said at least one exercise machine 5, from said images representative of a physical exercise performed by the user U using said at least one exercise tool 10 and from said images representative of a bodyweight physical exercise performed by the user U.

In accordance with an embodiment, in combination with any of the preceding ones, the at least one image acquisition device 4 is configured to acquire the identification images of the user U at the time of entry of the user U into the training space A.

In this embodiment, the at least one image acquisition device 4 is further configured to acquire said images representative of the user U while performing a physical exercise using said at least one exercise machine 5, said images representative of a physical exercise performed by the user U using said at least one exercise tool 10, and said images representative of a bodyweight physical exercise performed by the user U during the permanence of the user U in the training space A.

In accordance with an embodiment, in combination with any of the preceding ones, the at least one central data processing unit 1 is configured to associate the user U, based on the acquired images, with the at least one exercise machine 5 or the at least one exercise tool 10 used by the user U to perform the physical exercise as well as the respective training data of the user U.

In accordance with an embodiment, in combination with any of the preceding ones, the at least one central data processing unit 1 is configured to establish, based on the images received from the at least one image acquisition device 4, whether the user U is stationary inside the training space A, whether the user is moving inside the training space A, and/or whether the user is performing movements corresponding to set reference movement patterns stored in the at least one central memory unit 2.

In accordance with an embodiment, in combination with the preceding one, the at least one central data processing unit 1 is configured, if the movements performed by the user U during the physical exercise correspond to set reference movement patterns stored in the at least one central memory unit 2, to count the set reference movement patterns performed.

In accordance with an embodiment, in combination with any one of the last two described, the at least one central data processing unit 1 is configured to:

- determine a power expressed by the user U while performing the physical exercise based on the identification images of the user U, the amplitude and speed of execution of the movements performed by the user U determined by processing the images acquired by the at least one image acquisition device 4 (optionally, the weight of the user U could also be used, determined based on the identification images of the user U) and/or an energy consumed by the user U (for example, number of calories) while performing the physical exercise based on the identification images of the user while performing a physical exercise on said at least one exercise machine 5, with said at least one exercise tool 10 and/or in a bodyweight physical exercise;
- associate the determined expressed power and/or the determined expressed energy with the set reference movement patterns, if the movements performed by the user U during the physical exercise correspond to said set reference movement patterns stored in the at least one central memory unit 2.

In accordance with an embodiment, in combination with any of the preceding ones in which the set reference movement patterns are present, said set reference movement patterns performed by the user U are movements of the body of the user U.

In accordance with an embodiment, in combination with any of the preceding ones in which the set reference movement patterns are present, said set reference movement patterns performed by the user are movements of said at least one exercise tool 10 moved by the user U.

In this embodiment, the at least one central data processing unit 1 is configured to:

- determine a power expressed by the user U and/or an energy expressed by the user U which is a function of the identification images of the user and of said at least one exercise tool 10 while performing a physical exercise;
- associate the determined expressed power and/or the determined expressed energy with the set reference movement patterns, if the movements performed by the user U during the physical exercise correspond to set reference movement patterns stored in the at least one central memory unit 2.

In accordance with an embodiment, in combination with or alternatively to any of the ones described above, the at least one central data processing unit 1 is configured to establish, based on the images acquired by the at least one image acquisition device 4, whether the user U is training on said at least one exercise machine 5.

It should be noted that for the purposes of this description, a user U who is "training" means, in addition to the performance of the training by the user U, that the user U is accessing or getting onto at least one exercise machine 5.

In an embodiment, in combination with the preceding one, the at least one central data processing unit 1 is configured to:

- determine a start time for the use of the at least one exercise machine 5 based on the analysis of the acquired images or based on an exercise start signal sent by the at least one exercise machine 5;
- receive in real time, from the at least one exercise machine 5, operating data of the at least one exercise machine 5 at set time intervals.

In accordance with an embodiment, in combination with the s preceding ones, when using the at least one exercise machine 5 by the user U, the at least one central data processing unit 1 is configured to perform at least one and/or more of the following operations:

- processing the acquired images of the user U while performing the physical exercise and comparing the processed images with set reference movement patterns for said at least one exercise machine 5 (analysis of exercise quality, posture, deviation with respect to a reference movement, and so on).
- receiving in real time, from the at least one exercise machine 5, operating data at set intervals (for example, with a set sampling frequency); such operating data (for example: slope/speed values for a treadmill, resistance/level for a bike, and so on) are synchronized with the data of the images acquired by comparing/aligning time stamps assigned along the time axis;
- recognizing an end time for the use of the at least one exercise machine 5 based on the analysis of the acquired images or based on an exercise end signal sent by the at least one exercise machine 5.

In an embodiment, in combination with the preceding one, the at least one central data processing unit 1 is further configured to:

- store, in the at least one central memory unit 2, the data on the exercise performed on the at least one exercise machine 5;
- calculate the results of the training or provide a report on the exercise performed based on the operating data received from the at least one exercise machine 5 and/or the acquired identification images of the user U.

For example, the at least one central data processing unit 1 is configured to calculate the calories consumed based on the operating data received from the at least one exercise machine 5 or on the acquired identification images of the user U.

In an embodiment, in combination with any of the ones described above, the at least one central data processing unit 1 is configured to detect, from the images acquired by the at least one image acquisition device 4, a configuration of the at least one exercise tool 10, for example, number of weights selected in a weight stack exercise tool, plates loaded on an exercise tool of the plate loaded type, amount of load on an exercise tool of the kettlebell type, plates loaded on an exercise tool of the rack or barbell type, and so on.

In a further embodiment, in combination with any of the ones described above, the at least one central data processing unit 1 is configured to assign to the user U the identification code of the user U at the time of entry of the user U into the training space A.

In accordance with this embodiment, the at least one central data processing unit 1 is configured to identify the user U during the permanence inside the training space A through the assigned identification code of the user U.

In this embodiment, the at least one central data processing unit 1 is configured to associate the user U identified with the assigned identification code of the user U with the training data of the user U while performing the training inside the training space A.

In a further embodiment, in combination with any of the ones described above, the images acquired by the at least one image acquisition device 4 comprise the identification code of the user U (for example, garment color, label on garment, wearable device of the bracelet type, and so on) and information representative of the posture and/or movements performed by the user U.

In this embodiment, the at least one central data processing unit 1 is configured to extract, in real time, from the acquired images, and store in the at least one central memory unit 2 the identification code of the user U and the information representative of the posture and/or movements performed by the user U.

In accordance with an embodiment, in combination with any of the ones described above, the at least one image acquisition device 4 is installed in the training space A (for example, mounted on a wall or on a post in a gym (outdoor or indoor gym), on a wall in a home space (outdoor or indoor space), on an exercise machine (in the gym or at home).

In accordance with an embodiment, in combination with any of the ones described above and alternatively to the preceding one, the at least one image acquisition device 4 is integrated in a portable electronic device of the user (for example a smartphone or a tablet) or in another electronic device (for example, a console) installed or present (even simply resting inside the training space A, for example on an exercise machine, on a piece of furniture, on a shelf, on the windowsill of a window or of a balcony) inside the training space A.

In accordance with an embodiment, in combination with any of the ones described above and alternatively to the preceding two, the at least one image acquisition device 4 is integrated in the at least one exercise machine 5.

In accordance with an embodiment, in combination with any of the ones described above, the at least one image acquisition device 4 is configured to communicate data to a portable electronic device of the user (for example, a smartphone or a tablet), for example, by means of the data communication network NTW described above.

In an embodiment, in combination with any of the ones described above and shown in FIG. 2*a*, the at least one central data processing unit 1 and the at least one central memory unit 2 are integrated in the at least one image acquisition device 4.

Figure 2A:
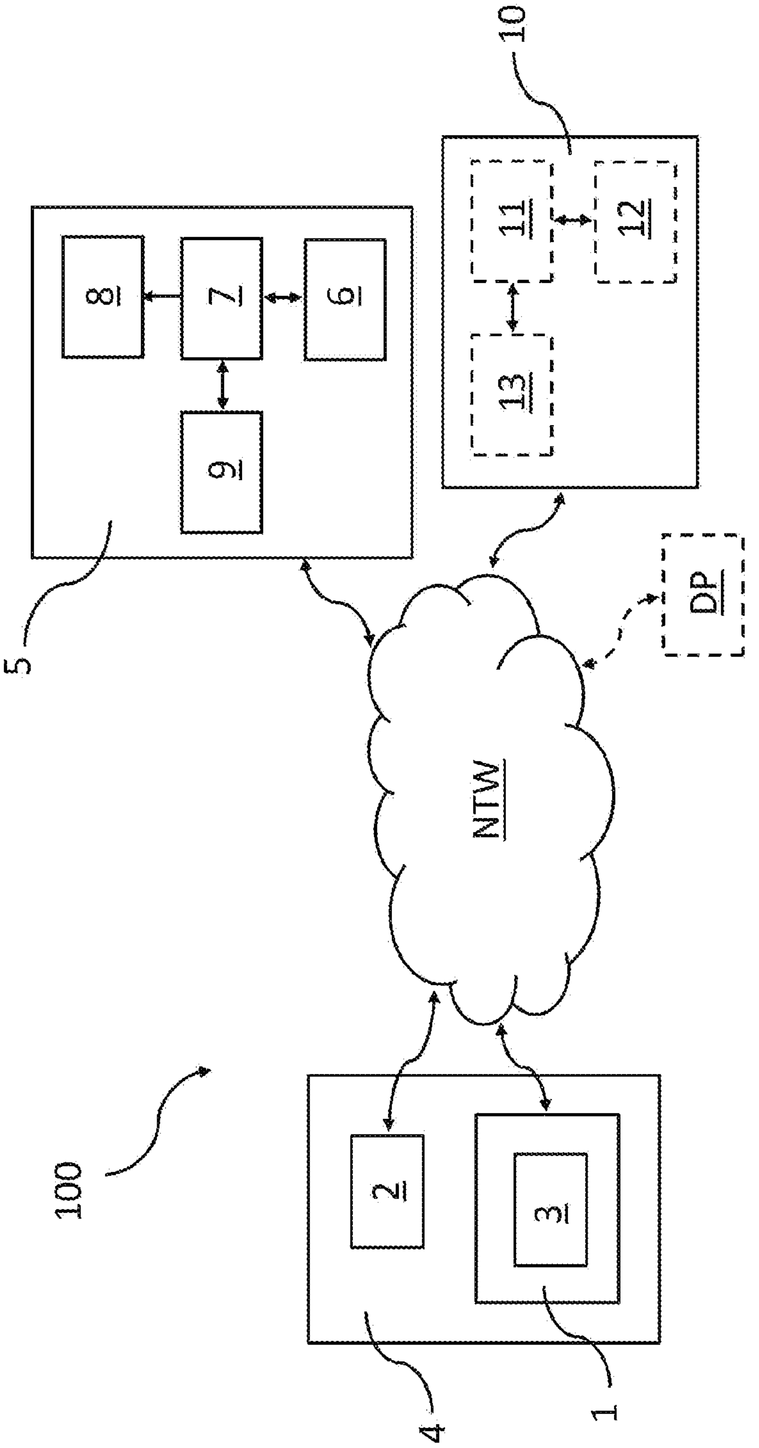
FIGS. 2*a*-2*f* each show, by means of a respective block diagram, the system in FIG. 1 in accordance with a respective embodiment.
Figure 2B:
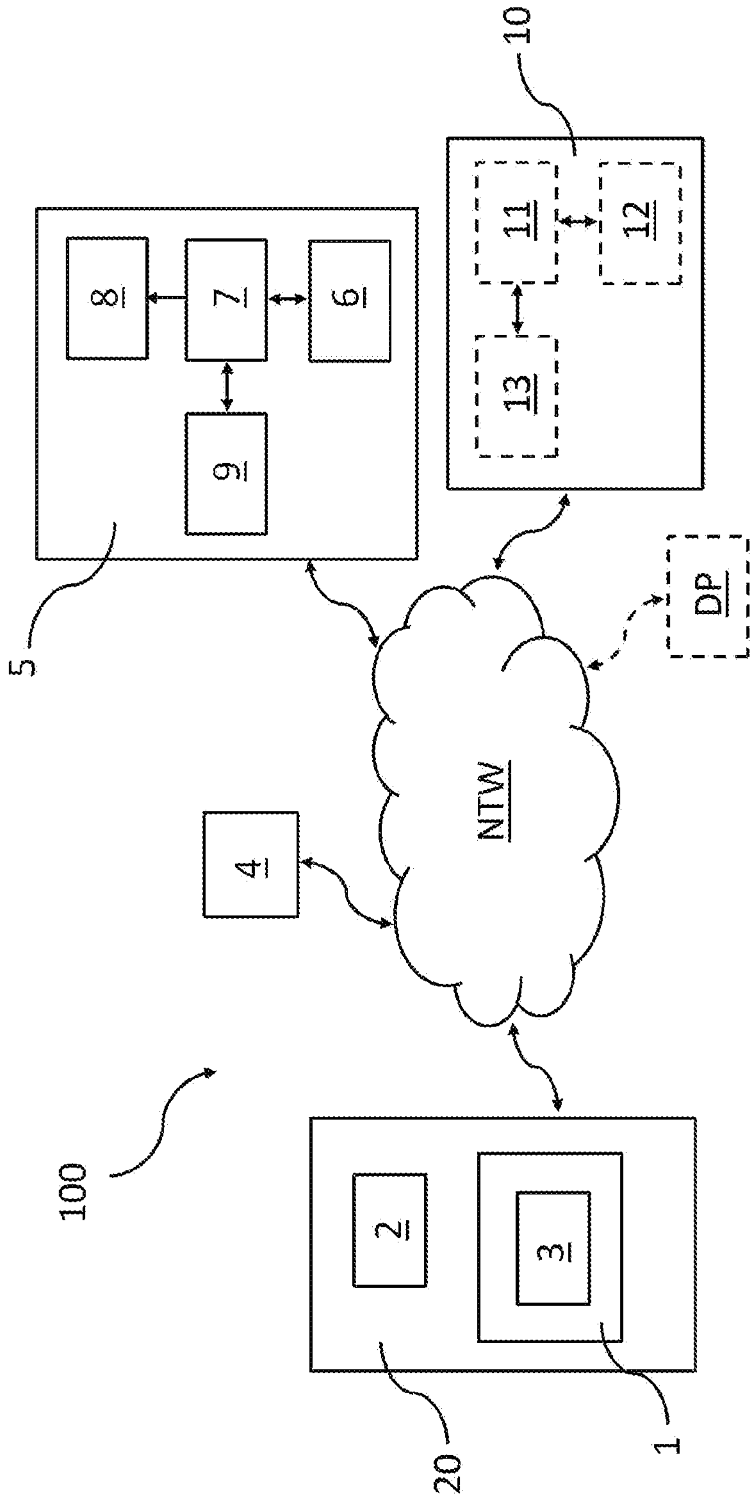

In a further embodiment, alternatively to the preceding one and shown in FIG. 2*b*, the system 100 comprises an electronic computer 20 present inside the training space A.

In this embodiment, the at least one central data processing unit 1 and the at least one central memory unit 2 are integrated in the electronic computer 20.

In this embodiment, the at least one image acquisition device 4 is operatively connected to the central data processing unit 1.

In accordance with different embodiments, in combination with the preceding one, the at least one image acquisition device 4 is operatively connected to the at least one central data processing unit 1 in a wired mode or in a wireless mode.

In an embodiment, the at least one image acquisition device 4 is operatively connected to the at least one central data processing unit 1 by means of the data communication network NTW, already described above.

In a further embodiment, alternatively or in combination with the preceding one, the at least one image acquisition device 4 is operatively connected to the atleast one central data processing unit 1 in a wireless mode by means of a wireless technology data communication channel such as, for example, a Wi-Fi, Bluetooth, NFC data communication channel, and so on.

In this embodiment, the at least one image acquisition device 4 is configured to communicate data with the at least one central data processing unit 1.

In accordance with different embodiments, the data communication between the at least one image acquisition device 4 and the at least one central data processing unit 1 can occur by means of the data communication network NTW and/or a wireless technology data communication channel (Wi-Fi, Bluetooth, NFC, and so on).

Figure 2C:
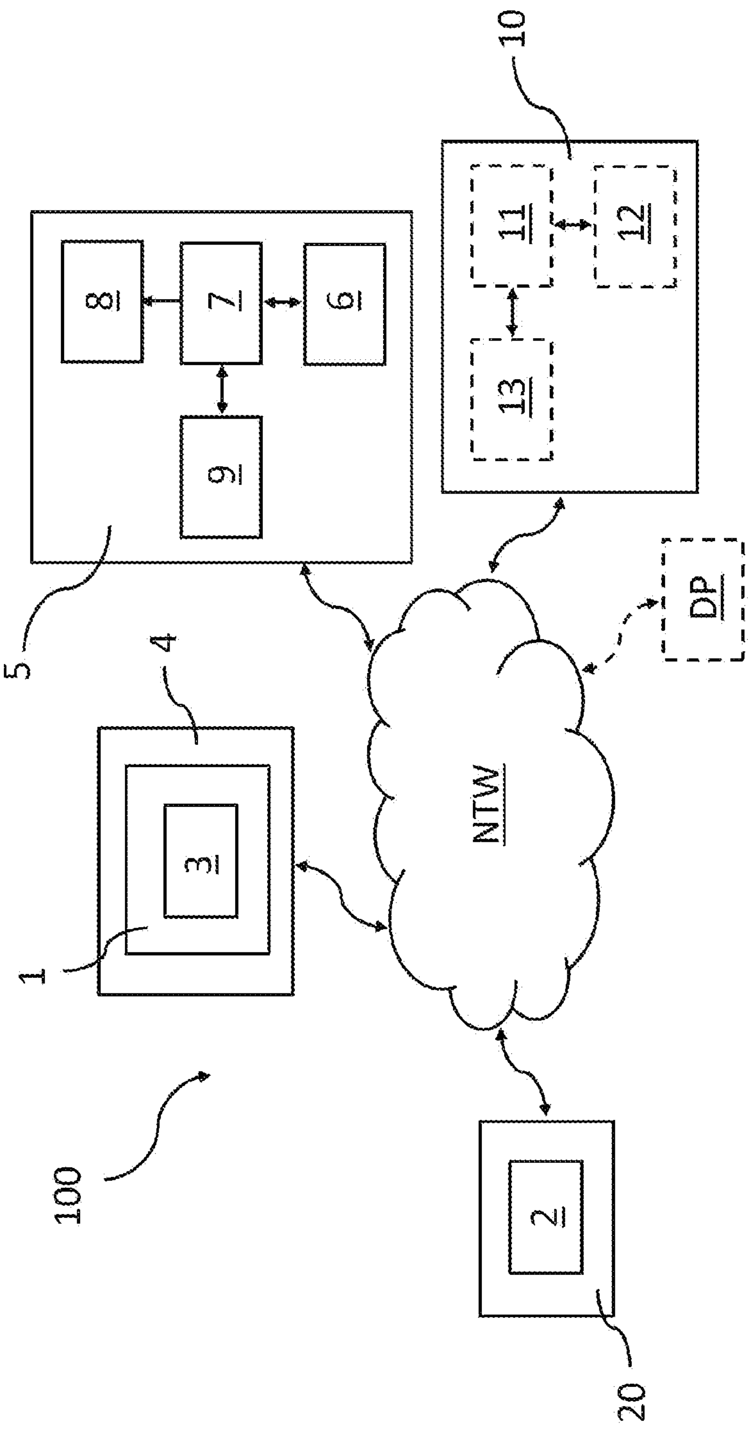

In a further embodiment, alternative to those in FIGS. 2*a* and 2*b*, shown in FIG. 2*c*, the system 100 comprises an electronic computer 20 present inside the training space A.

In this embodiment, the at least one central data processing unit 1 is integrated in the at least one image acquisition device 4 and the at least one central memory unit 2 is integrated in the electronic computer 20.

Figure 2D:
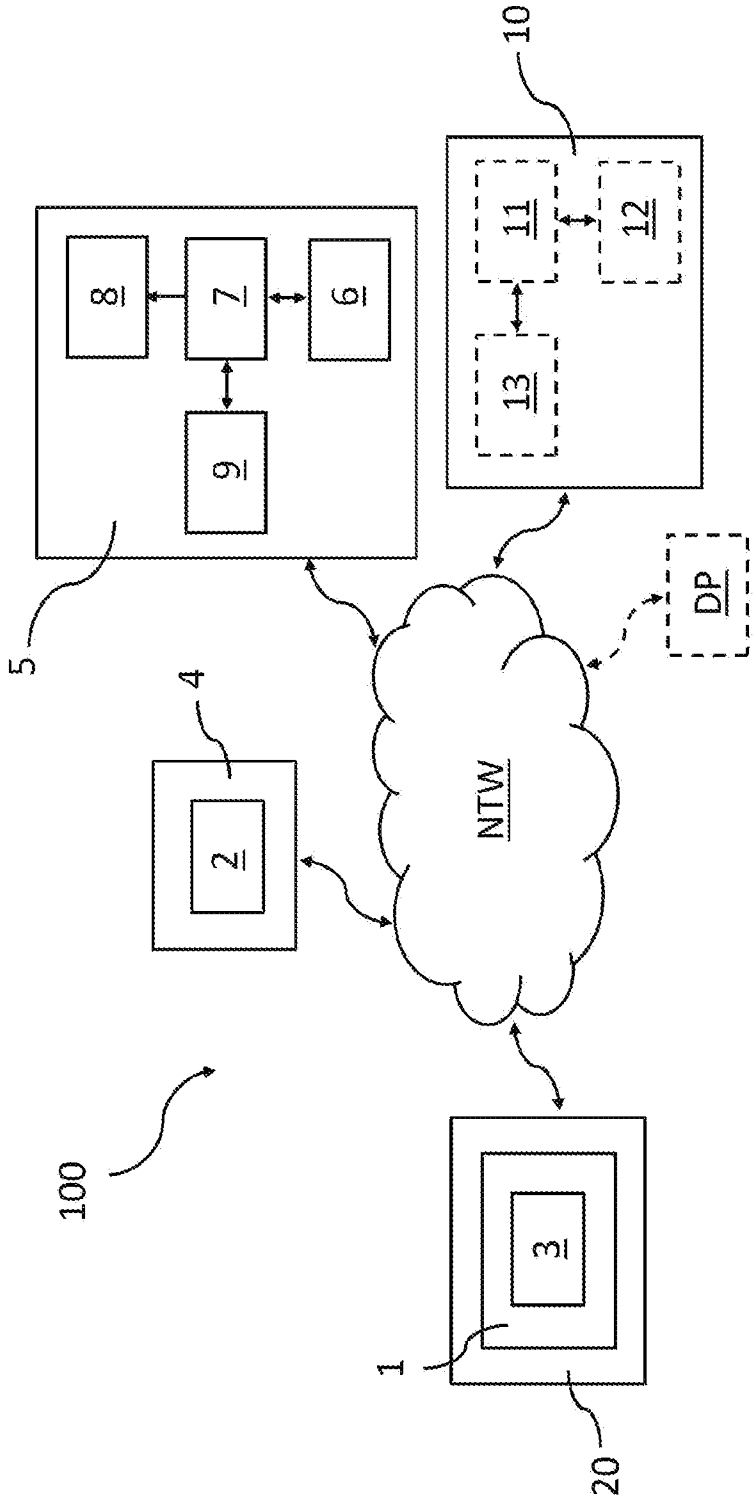

In a further embodiment, alternative to those in FIGS. 2*a* and 2*b* and 2*c*, shown in FIG. 2*d*, the system 100 comprises an electronic computer 20 present inside the training space A.

In this embodiment, the at least one central data processing unit 1 is integrated in the electronic computer 20 and the at least one central memory unit 2 is integrated in the at least one image acquisition device 4.

Figure 2E:
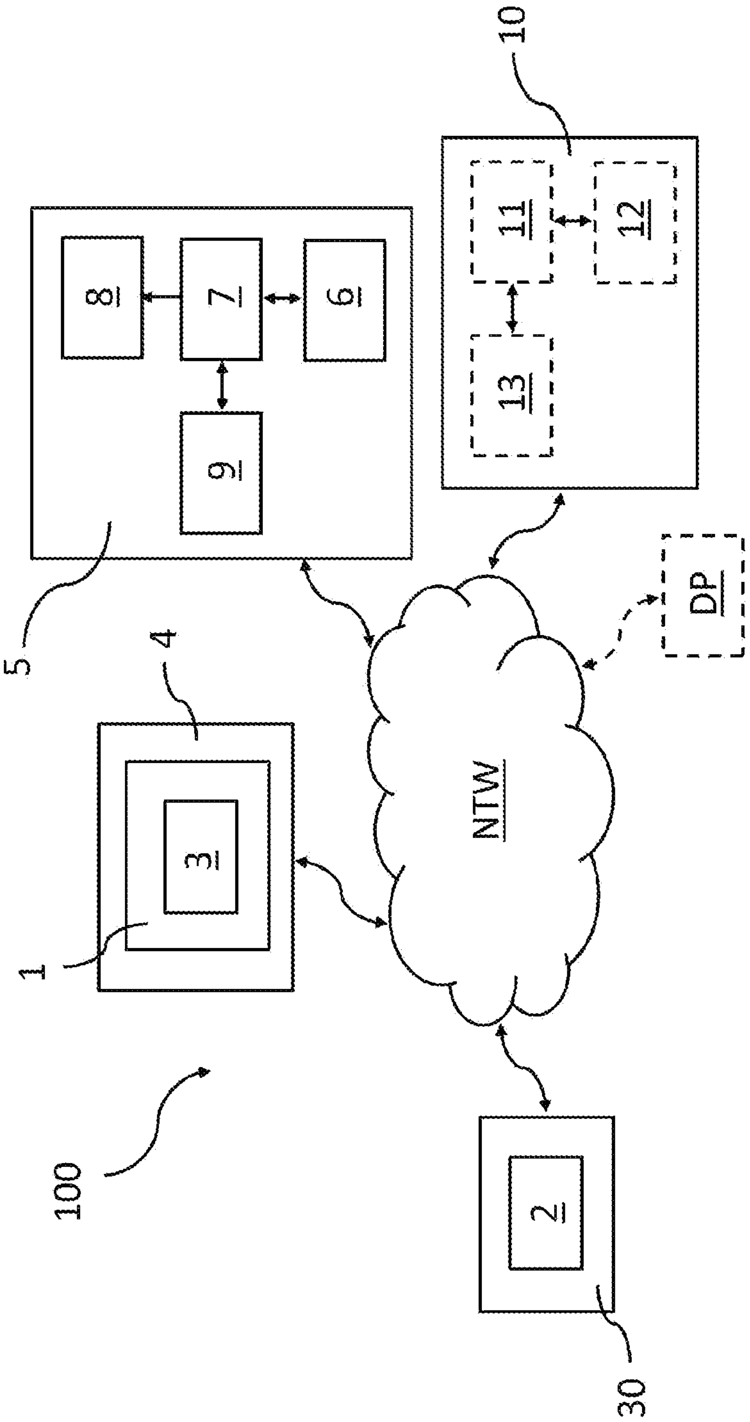

In a further embodiment, alternative to those in FIGS. 2*a*, 2*b*, 2*c*, 2*d*, shown in FIG. 2*e*, the system 100 comprises an electronic computer 30 which is remote with respect to the training space A, for example a cloud server.

In this embodiment, the at least one central data processing unit 1 is integrated in the at least one image acquisition device 4 and the at least one central memory unit 2 is integrated in the remote electronic computer 30.

In an embodiment, in combination with the preceding one, the at least one image acquisition device 4 is operatively connected to the remote electronic computer 30.

In accordance with different embodiments, the at least one image acquisition device 4 is operatively connected to the remote electronic computer 30 in a wired mode or in a wireless mode.

In an embodiment, the at least one image acquisition device 4 is operatively connected to the remote electronic computer 30 by means of the data communication network NTW, already described above.

In a further embodiment, alternatively or in combination with the preceding one, the at least one image acquisition device 4 is operatively connected to the remote electronic computer 30 in a wireless mode by means of a wireless technology data communication channel such as, for example, a Wi-Fi, Bluetooth, NFC data communication channel, and soon.

In this embodiment, the at least one image acquisition device 4 is configured to communicate data with the remote electronic computer 30.

In accordance with different embodiments, the data communication between the at least one image acquisition device 4 and the remote electronic computer 30 can occur by means of the data communication network NTW and/or a wireless technology data communication channel (Wi-Fi, Bluetooth, NFC, and so on).

Figure 2F:
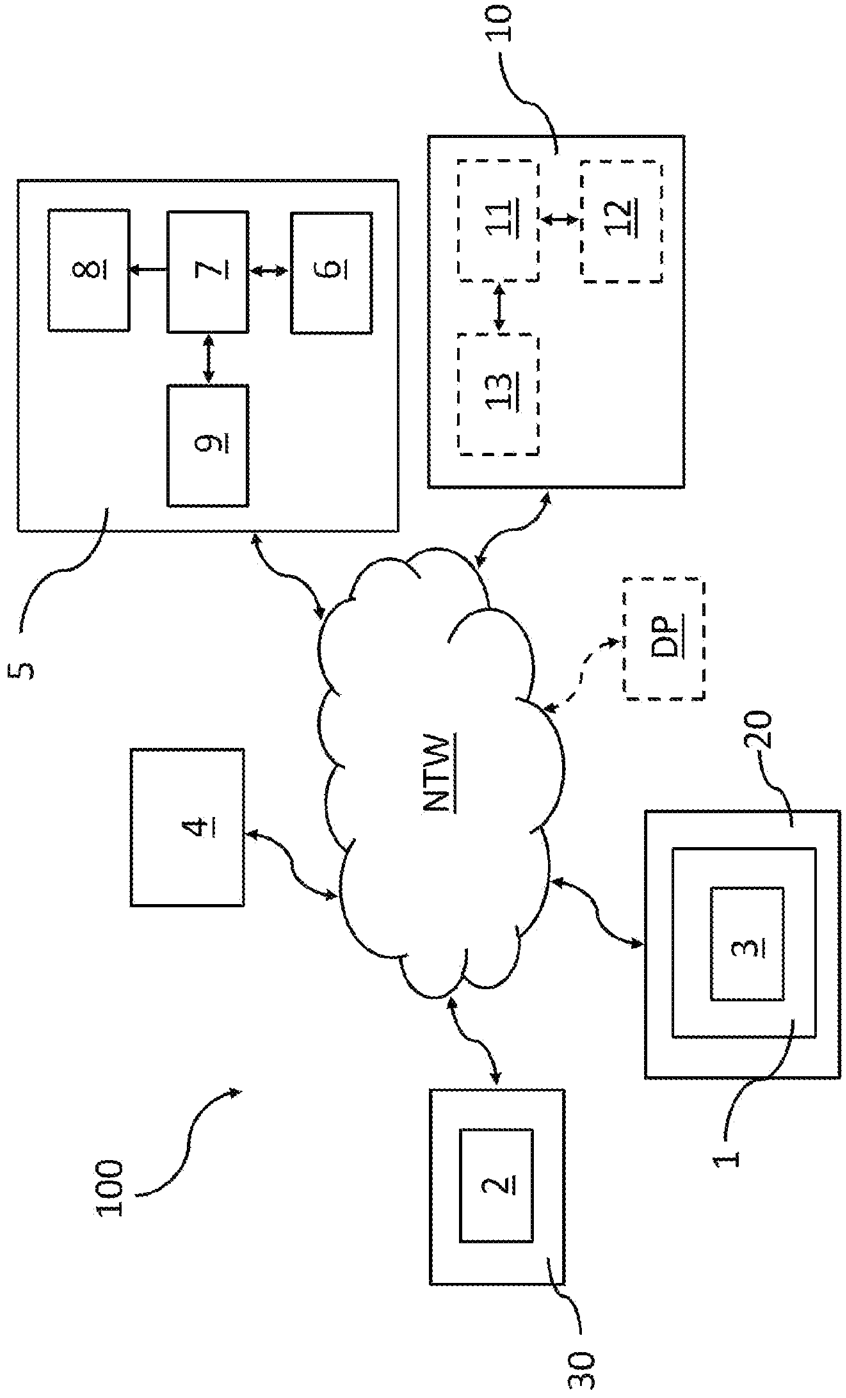

In a further embodiment, alternative to those in FIGS. 2*a*, 2*b*, 2*c*, 2*d* and 2*e*, shown in FIGS. 2*f*, the system 100 comprises an electronic computer 20 present inside the training space A and an electronic computer 30 which is remote with respect to the training space A, for example a cloud server.

In this embodiment, the at least one central data processing unit 1 is integrated in the electronic computer 20 and the at least one central memory unit 2 is integrated in the remote electronic computer 30.

In this embodiment, the at least one image acquisition device 4 and the electronic computer 20 are operatively connected to each other and to the remote electronic computer 30.

In accordance with different embodiments, the at least one image acquisition device 4 and the electronic computer 20 are operatively connected to each other and to the remote electronic computer 30 in a wired mode or in a wireless mode.

In an embodiment, the at least one image acquisition device 4 and the electronic computer 20 are operatively connected to one another and to the remote electronic computer 30 by means of the data communication network NTW, already described above.

In a further embodiment, alternatively or in combination with the preceding one, the at least one image acquisition device 4 and the electronic computer 20 are operatively connected to each other and to the remote s electronic computer 30 in a wireless mode by means of a wireless technology data communication channel such as, for example, a Wi-Fi, Bluetooth, NFC data communication channel, and so on.

In this embodiment, the at least one image acquisition device 4 and the electronic computer 20 are configured to communicate data with one another and with the remote electronic computer 30.

In accordance with different embodiments, the data communication between the at least one image acquisition device 4, the electronic computer 20 and the remote electronic computer 30 can occur by means of the data communication network NTW and/or a wireless technology data communication channel (Wi-Fi, Bluetooth, NFC, and so on).

In an embodiment, not shown in the Figures, in combination with any of the ones described above, the at least one central data processing unit 1 comprises one or more data processing modules distributed on one or more of said at least one image acquisition device 4 and/or the electronic computer 20 present inside the training space A (if present).

In an embodiment, not shown in the Figures, in combination with any of the ones described above and alternatively to the preceding one, the at least one central data processing unit 1 comprises one or more data processing modules distributed on one or more of said atleast one image acquisition device 4 and/or an electronic computer 20 present inside the training space A (if present).

In this embodiment, the at least one central memory unit 2 comprises one or more memory modules distributed on one or more of said at least one image acquisition device 4 and/or on said electronic computer 20 present inside the training space A (if present) and/or on an electronic computer 30 which is remote with respect to training space A (if present).

Figure 5:
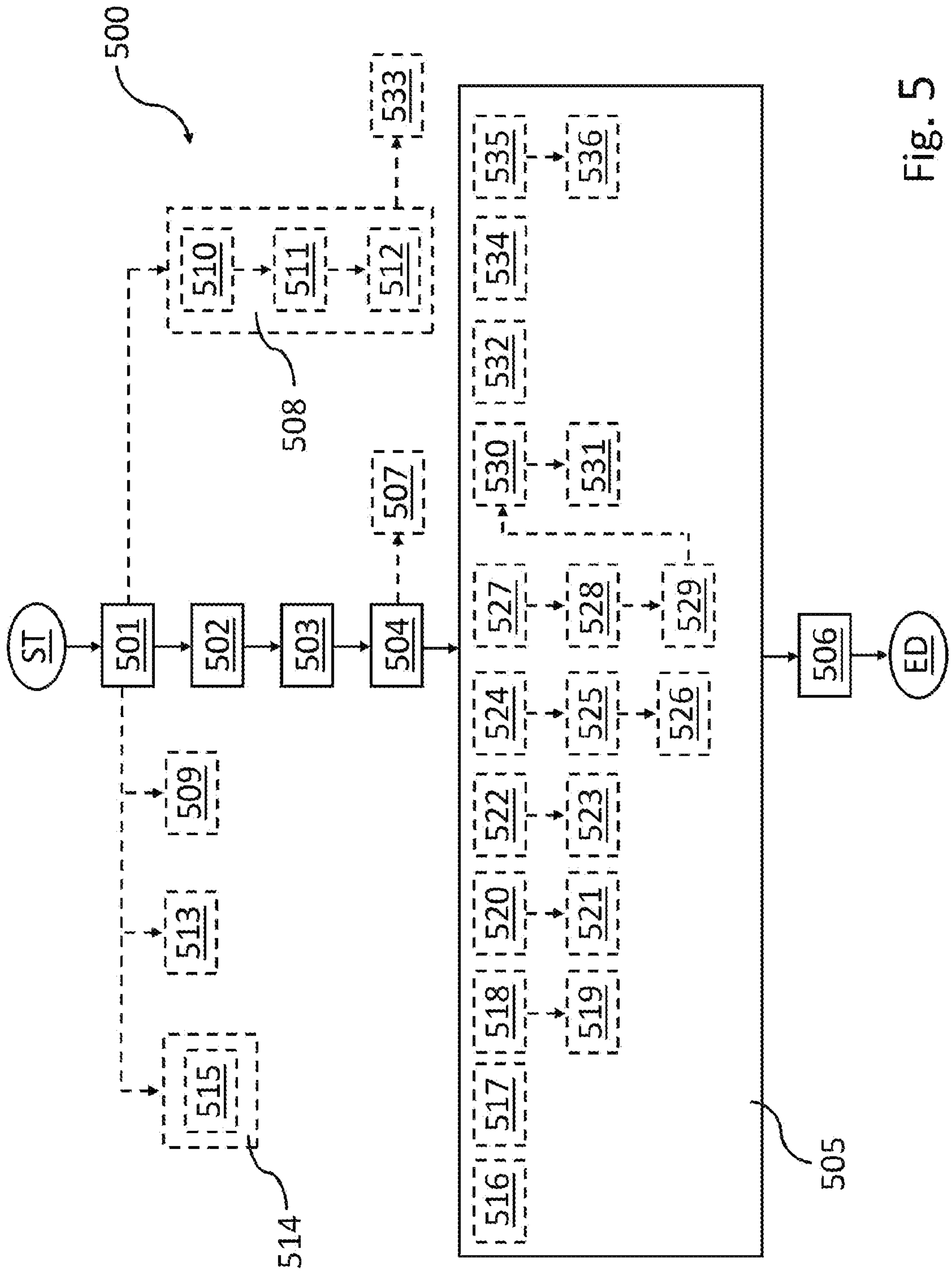

With reference to FIG. 5, a method 500 for determining and storing identification data of a user U and respective training data of the user in a training space A is now described, hereinafter also simply a method, according to an embodiment of the present invention.

It is worth noting that the components, data and information mentioned below with the description of the method have already been described previously with reference to the system 100 and will therefore not be repeated for the sake of brevity.

The method 500 comprises a symbolic step of starting ST.

The method 500 comprises a step of acquiring 501, by at least one image acquisition device 4 present inside the training space A and operatively connected to the at least one central data processing unit 1, identification images of the user U in the training space A.

The at least one image acquisition device 4 is configured to communicate data with the at least one central data processing unit 1.

The at least one image acquisition device 4, according to different embodiments, has been described above.

The method 500 further comprises a step of acquiring 502, by the at least one image acquisition device 4, images representative of the user U while performing a bodyweight physical exercise in the training space A.

The method 500 further comprises a step of acquiring 503, by the at least one image acquisition device 4, images representative of the user U and of at least one exercise machine 5 present inside the training space A, while performing a physical exercise using said at least one exercise machine 5.

The at least one exercise machine 5 is operatively connected to the at least one central data processing unit 1.

The at least one exercise machine 5 is configured to communicate data with the at least one central data processing unit 1.

The at least one exercise machine 5 comprises at least one actuator 6 which is operable while performing the physical exercise.

The at least one exercise machine 5, in accordance with various embodiments, has been described above.

With reference to FIG. 5, the method 500 further comprises a step of acquiring 504, by the at least one image acquisition device 4, images representative of the user U and of at least one exercise tool 10 while performing a physical exercise performed by the user U using said at least one exercise tool 10.

The at least one exercise tool 10 is free from any actuator which is operable while performing a physical exercise.

The at least one exercise tool 10, in accordance with various embodiments, has been described above.

The method 500 further comprises a step of determining 505, by the at least one central data processing unit 1, identification data of the user U and training data of the user U inside the training space A determined based on the images acquired by said at least one image acquisition device 4.

Examples of methodologies, algorithms or techniques usable by the at least one central data processing unit 1 to carry out the step of determining 505 have been described above.

The method 500 further comprises a step of storing 506, by the at least one central data processing unit 1, the determined identification data of the user U and training data of the user U inside the training space A in at least one central memory unit 2 operatively connected to the at least one central data processing unit 1.

The method 500 comprises a symbolic step of ending ED.

In accordance with an embodiment, shown with dashed lines in FIG. 5, the method 500 comprises a step of providing 507, by the at least one image acquisition device 4, the at least one central data processing unit 1 with the acquired images.

In accordance with an embodiment, shown with dashed lines in FIG. 5, in combination with any of the preceding ones, the method 500 comprises a step of assigning 508, by the at least one central data processing unit 1, to the user U, an identification code of the user U.

The identification code of the user U comprises the identification data of the user U.

In an embodiment, shown with dashed lines in FIG. 5, in combination with the preceding one, the method 500 comprises a step of recognizing 509, by the at least one central data processing unit 1, the user U from the acquired identification images of the user U, and using the assigned identification code of the user U to determine the data of the user U during the presence inside the training space A in association with the identification data of the user U comprised in the identification code of the user U.

Techniques for recognizing the user (face and/or body) have been described above.

In an embodiment, shown with dashed lines in FIG. 5, in combination with the preceding ones, as for the assignment to the user of the respective identification code of the user U, the step of assigning 508 the identification code of the user U comprises a step of determining 510, by the at least one central data processing unit 1, a schematic reference model (skeleton or body outline) representative of the user, from a processing of first identification images of the user U, acquired during an initial authentication step (by acquiring an image of the face and/or body) of the user U.

Such a schematic reference model comprises a plurality of key elements (for example, nodes and/or anatomical segments) with which to uniquely represent the user U.

In this embodiment, in combination with the preceding one, the step of assigning 508 the identification code of the user U further comprises a step of storing 511, by the at least one central data processing unit 1, such a schematic reference model in the at least one central memory unit 2.

In this embodiment, the assigning step 508 the identification code of the user U further comprises a step of generating 512, by the at least one central data processing unit 1, the respective identification code of the user U, for example a string of alphanumeric characters and/or symbols, based on such a processing.

In accordance with a further embodiment, shown with dashed lines in FIG. 5 and alternative to the preceding ones, the method 500 comprises a step of acquiring 513, by the at least one central data processing unit 1, the identification code of the user U from a personal device DP (described above) which is wearable by the user U.

In accordance with an embodiment, in combination with any of the preceding ones, shown with dashed lines in FIG. 5, the method 500 comprises a step of recognizing 514, by the at least one central data processing unit 1, the face of the user U from an identification image of the user U acquired by the at least one image acquisition device 4.

In greater detail, in this embodiment, the step of recognizing 514 the face of the user comprises a step of comparing 515, by the at least one central data processing unit 1, the identification image of the user U acquired by the at least one image acquisition device 4 with a schematic reference model (described above) stored in the at least one central memory unit 2.

In accordance with an embodiment, in combination with any of the preceding ones, and shown with dashed lines in FIG. 5, the step of determining 505 the identification data of the user U and the training data of the user U inside the training space A comprises a step of determining 516, by the at least one central data processing unit 1, information representative of the posture of and/or movements performed by the user U from said images representative of the user U while performing a physical exercise using said at least one exercise machine 5, from said images representative of a physical exercise performed by the user U using said at least one exercise tool 10 and from said images representative of a bodyweight physical exercise performed by the user U.

In accordance with an embodiment, in combination with any of the preceding ones, the step of acquiring 502, by the at least one image acquisition device 4, the identification images of the user U is performed at the time of entry of the user U into the training space A.

In an embodiment, in combination with the preceding one, the steps of acquiring 502-504 said images representative of the user U while performing a physical exercise using said at least one exercise machine 5, said images representative of a physical exercise performed by the user U using said at least one exercise tool 10 and said images representative of a bodyweight physical exercise performed by the user U are performed by the at least one image acquisition device 4, during the permanence of the user U in the training space A.

In accordance with an embodiment, in combination with any of the preceding ones, and shown with dashed lines, the step of determining 505 comprises a step of associating 517 with the user U, by the at least one central data processing unit 1, based on the acquired images, the at least one exercise machine 5 or the at least one exercise tool 10 which the user U is using to perform the physical exercise and the respective training data of the user U.

In accordance with an embodiment, in combination with any one of the preceding ones, and shown with dashed lines in FIG. 5, the step of determining 505 the identification data of the user U and the training data of the user U inside the training space A comprises a step of establishing 518, by the at least one central data processing unit 1, based on the images received from the at least one image acquisition device 4, whether the user U is stationary inside the training space A, whether the user is moving inside the training space A, and/or whether the user is performing movements corresponding to set reference movement patterns stored in the at least one central memory unit 2.

In accordance with an embodiment, in combination with the preceding one, and shown with dashed lines in FIG. 5, the step of determining 505 the identification data of the user U and the training data of the user U inside the training space A further comprises a step of counting 519, by the at least one central data processing unit 1, if the movements performed by the user U during the physical exercise correspond to set reference movement patterns stored in the at least one central memory unit 2, the set reference movement patterns performed.

In accordance with an embodiment, in combination with any one of the last two described, and shown with dashed lines in FIG. 5, the step of determining 505 the identification data of the user U and the training data of the user U inside the training space A further comprises steps of:

determining 520, by the at least one central data processing unit 1, a power expressed by the user U while performing the physical exercise based on the identification images of the user, the amplitude and speed of execution of the movements performed by the user U determined by processing the images acquired by the at least one image acquisition device 4 (optionally, the weight of the user U could also be used, determined based on the identification images of the user) and/or the energy expressed by the user U while performing the physical exercise based on the identification images of the user while performing a physical exercise on said at least one exercise machine 5, with said at least one exercise tool 10 and/or in a bodyweight physical exercise;

associating 521, by the at least one central data processing unit 1, the determined expressed power and/or the determined expressed energy with the set reference movement patterns, if the movements performed by the user U during the physical exercise correspond to said set reference movement patterns stored in the at least one central memory unit 2.

In accordance with an embodiment, in combination with any of the preceding ones in which the set reference movement patterns are present, said set reference movement patterns performed by the user are movements of said at least one exercise tool 10 moved by the user U.

In a further embodiment, in combination with the preceding one, the step of determining 505 the identification data of the user U and the training data of the user U inside the training space A further comprises steps of:

determining 522, by the at least one central data processing unit 1, a power expressed by the user U and/or an energy expressed by the user U which is a function of the identification images of the user and of said at least one exercise tool 10 while performing a physical exercise;

associating 523, by the at least one central data processing unit 1, the determined expressed power and/or the determined expressed energy with the set reference movement patterns, if the movements performed by the user U during the physical exercise correspond to set reference movement patterns stored in the memory module 3 of the central data processing unit 1.

In accordance with an embodiment, in combination with or alternatively to any of the ones described above, and shown with dashed lines in FIG. 5, the step of determining 505 the identification data of the user U and the training data of the user U inside the training space A comprises a step of establishing 524, by the at least one central data processing unit 1, based on the images acquired by the at least one image acquisition device 4, whether the user U is training on said at least one exercise machine 5.

It is reiterated that for the purposes of this description, a user U who is "training" means, in addition to the performance of the training by the user U, that the user U is accessing or getting onto at least one exercise machine 5.

In an embodiment, in combination with the preceding one, and shown with dashed lines in FIG. 5, the step of determining 505 the identification data of the user U and the training data of the user U inside the training space A further comprises steps of:

determining 525, by the at least one central data processing unit 1, a start time for the use of the at least one exercise machine 5 based on the analysis of the acquired images or based on an exercise start signal sent by the at least one exercise machine 5;

receiving 526 in real time, by the at least one central data processing unit 1, from the at least one exercise machine 5, operating data of the at least one exercise machine 5 at set time intervals (for example, with a set sampling frequency); such operating data (for example: slope/speed values for a treadmill, resistance/level for a bike, and so on) are synchronized with the data of the images acquired by comparing/aligning time stamps assigned along the time axis.

In accordance with an embodiment, in combination with the preceding ones, and shown with dashed lines in FIG. 5, the step of determining 505 the identification data of the user U and the training data of the user U inside the training space A, during the use of the at least one exercise machine 5 by the user U, comprises steps of:

processing 527, by the at least one central data processing unit 1, the images of the user U acquired while performing the physical exercise;

comparing 528, by the at least one central data processing unit 1, the processed images with set reference movement patterns for said at least one exercise machine 5 (analysis of exercise quality, posture, deviation with respect to a reference movement, and so on);

recognizing 529, by the at least one central data processing unit 1, an end time for the use of the at least one exercise machine 5 based on the analysis of the acquired images or based on an exercise end signal sent by the at least one exercise machine 5.

In an embodiment, in combination with the preceding one, and shown with dashed lines in FIG. 5, the step of determining 505 the identification data of the user U and the training data of the user U inside the training space A further comprises steps of:

storing 530, by the at least one central data processing unit 1, in the at least one central memory unit 2, the data on the exercise performed on the at least one exercise machine 5;

calculating 531, by the at least one central data processing unit 1, the results of the training or providing a report on the exercise performed based on the operating data received from the at least one exercise machine 5 and/or the acquired identification images of the user U.

For example, the at least one central data processing unit 1 can calculate the calories consumed based on the operating data received from the at least one exercise machine 5 or on the acquired identification images of the user U.

In an embodiment, in combination with any of the ones described above, and shown with dashed lines in FIG. 5, the step of determining 505 the identification data of the user U and the training data of the user U inside the training space A further comprises a step of detecting 532, by the at least one central data processing unit 1, from the images acquired by the at least one image acquisition device 4, a configuration of the at least one exercise tool 10 (for example, number of weights selected in a weight stack exercise tool, plates loaded on an exercise tool of the plate loaded type, amount of load on an exercise tool of the kettlebell type, plates loaded on an exercise tool of the rack or barbell type, and so on).

In a further embodiment, in combination with any of the ones described above, and shown with dashed lines in FIG. 5, the step of assigning 508 to the user U the identification code of the user U is carried out by the at least one central data processing unit 1 at the time of entry of the user U into the training space A.

In accordance with this embodiment, shown with dashed lines in FIG. 5, and in combination with any of the preceding ones when relating to the step of assigning 508 the identification code of the user U, the method 500 comprises a step of identifying 533, by the at least one central data processing unit 1, the user U during the permanence inside the training space A by means of the assigned identification code of the user U.

In one embodiment, in combination with the preceding one, and shown with dashed lines in FIG. 5, the step of determining 505 the identification data of the user U and the training data of the user U inside the training space A comprises a step of associating 534, by the at least one central data processing unit 1, with the user U identified with the assigned identification code of the user U, the training data of the user U while performing the training inside the training space A.

In a further embodiment, in combination with any of the ones described above, and shown with dashed lines in FIG. 5, if the images acquired by the at least one image acquisition device 4 comprise the identification code of the user U (for example, garment color, label on garment, wearable device of the bracelet type, and so on) and information representative of the posture and/or movements performed by the user U, the step of determining 505 the identification data of the user U and the training data of the user U inside the training space A further comprises steps of

- extracting 535 in real time, by the at least one central data processing unit 1, from the acquired images, the identification code of the user U and the information representative of the posture and/or movements performed by the user U;
- storing 536 in the at least one central memory unit 2, by the at least one central data processing unit 1, the identification code of the user U and the information representative of the posture and/or movements performed by the user U.

With reference now, in particular, to FIGS. 4*a*-4*d*, an example of operation of the system 100 according to the present invention is described.

Figure 4A:
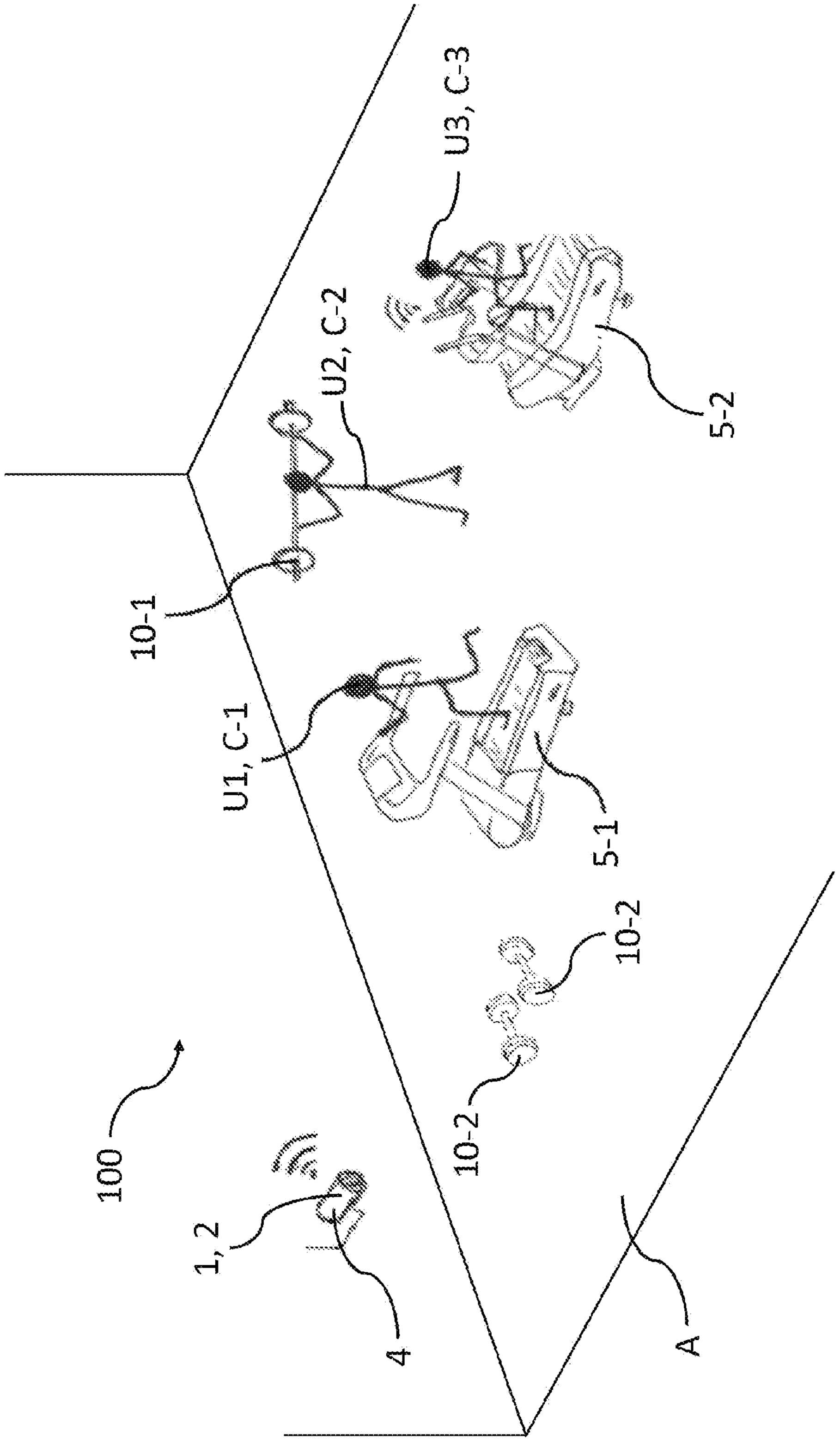
FIGS. 4*a*-4*d* diagrammatically show a representative sequence of the system in FIG. 1 during the training of a plurality of users, and FIG. 5 diagrammatically shows, by means of a block diagram, a method for determining and storing identification data of a user and respective training data of the user in a training space, in accordance with the present invention.

As shown in FIG. 4*a*, in the training space A, for example a gym, a first user U1 is training on a first treackmill 5-1, a second user U2 is training with a first exercise tool 10-1 (barbell), a third U3 user is training on a second treadmill 5-2.

The at least one image acquisition device 4 is a video camera installed on a wall of the training space A.

The at least one central data processing unit 1 and the at least one central memory unit 2 are integrated in the at least one image acquisition device 4.

With reference to FIG. 4*a*, for the first user U1, the at least one image acquisition device 4 acquires identification images of the first user U1 in the training space A and assigns to the first user U1 an identification code C-1.

The at least one image acquisition device 4 acquires images representative of the first user U1 and of the first treadmill 5-1 while performing a physical exercise performed by the first user U1 using the first treadmill 5-1.

Again with reference to FIG. 4*a*, for the second user U2, the at least one image acquisition device 4 acquires identification images of the second user U2 in the training space A and assigns to the second user U2 an identification code C-2.

The at least one image acquisition device 4 acquires images representative of the second user U2 and of the first exercise tool 10-1 (barbell) while performing a physical exercise performed by the second user U2 using the first exercise tool 10-1.

Again with reference to FIG. 4*a*, for the third user U3, the at least one image acquisition device 4 acquires identification images of the third user U3 in the training space A and assigns to the third user U3 an identification code C-3.

The at least one image acquisition device 4 acquires images representative of the third user U3 and of the second treadmill 5-2 while performing a physical exercise performed by the third user U3 using the second treadmill 5-2.

The at least one central data processing unit 1 determines, for each user U1, U2 and U3, identification data of the user and training data of the user inside the training space A determined based on the images acquired by said at least one image acquisition device 4.

Figure 4B:
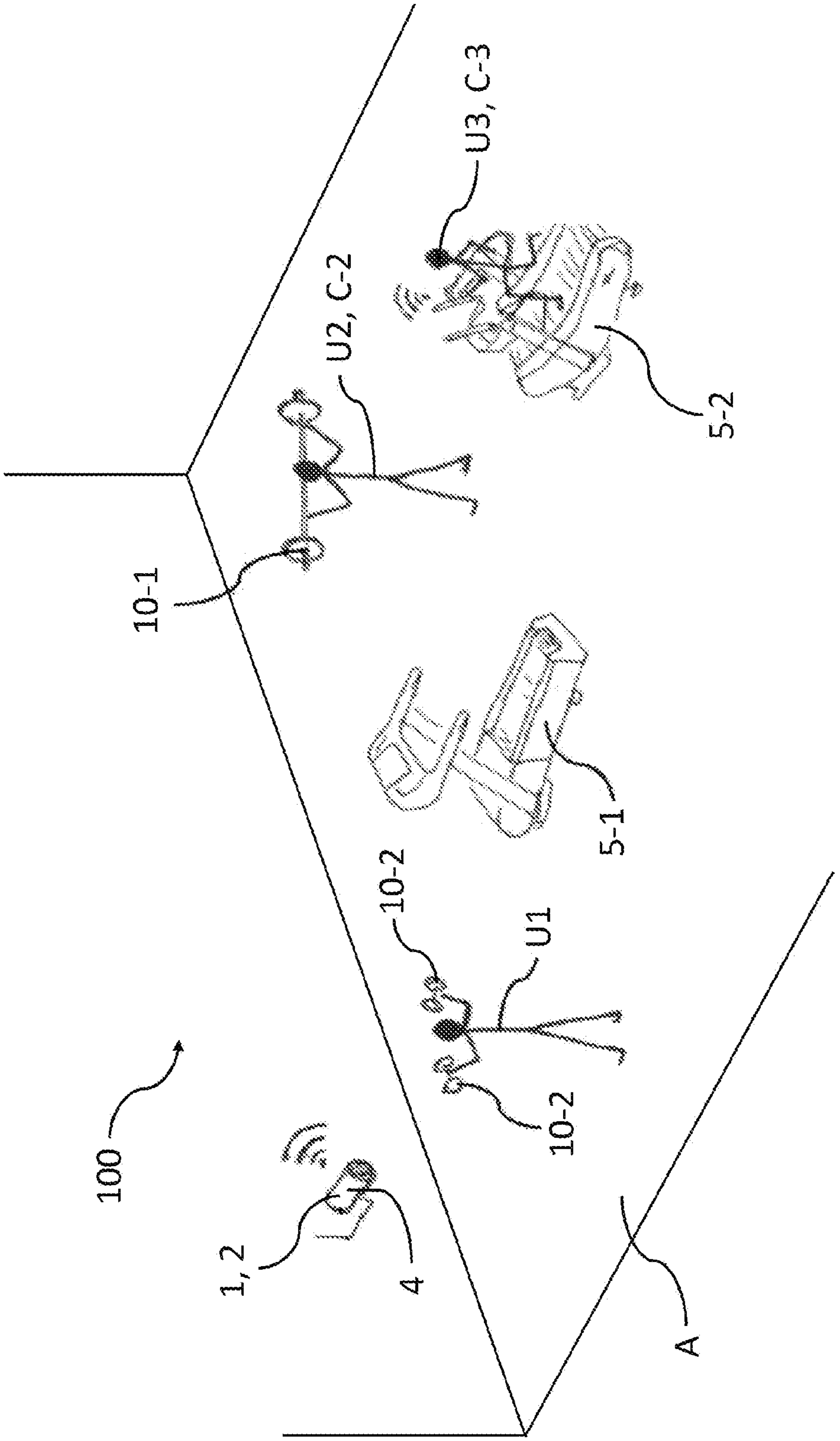

As shown in FIG. 4*b*, the first user U1 has moved from the first treadmill 5-1 and is now training with a second exercise tool 10-2 (dumbbells), the second user U2 is still training with the first exercise tool 10-1 (barbell) and the third user U3 is still training on a second treadmill 5-2.

The at least one image acquisition device 4, following the first user U1 identified by the respective user code C-1 assigned, acquires images representative of the first user U1 and of the second exercise tool 10-2 (dumbbells) while performing a physical exercise performed by the first user U1 using the second exercise tool 10-2.

Again with reference to FIG. 4*b*, the at least one image acquisition device 4 continues to acquire images representative of the second user U2 and of the first exercise tool 10-1 (barbell) while performing a physical exercise performed by the second user U2 using the first exercise tool 10.

The at least one image acquisition device 4 continues to acquire images representative of the third user U3 and of the second treadmill 5-2 while performing a physical exercise performed by the third user U3 using the second treadmill 5-2.

The at least one central data processing unit 1 determines, for each user U1, U2 and U3, identification data of the user and training data of the user inside the training space A determined based on the images acquired by said at least one image acquisition device 4.

Figure 4C:
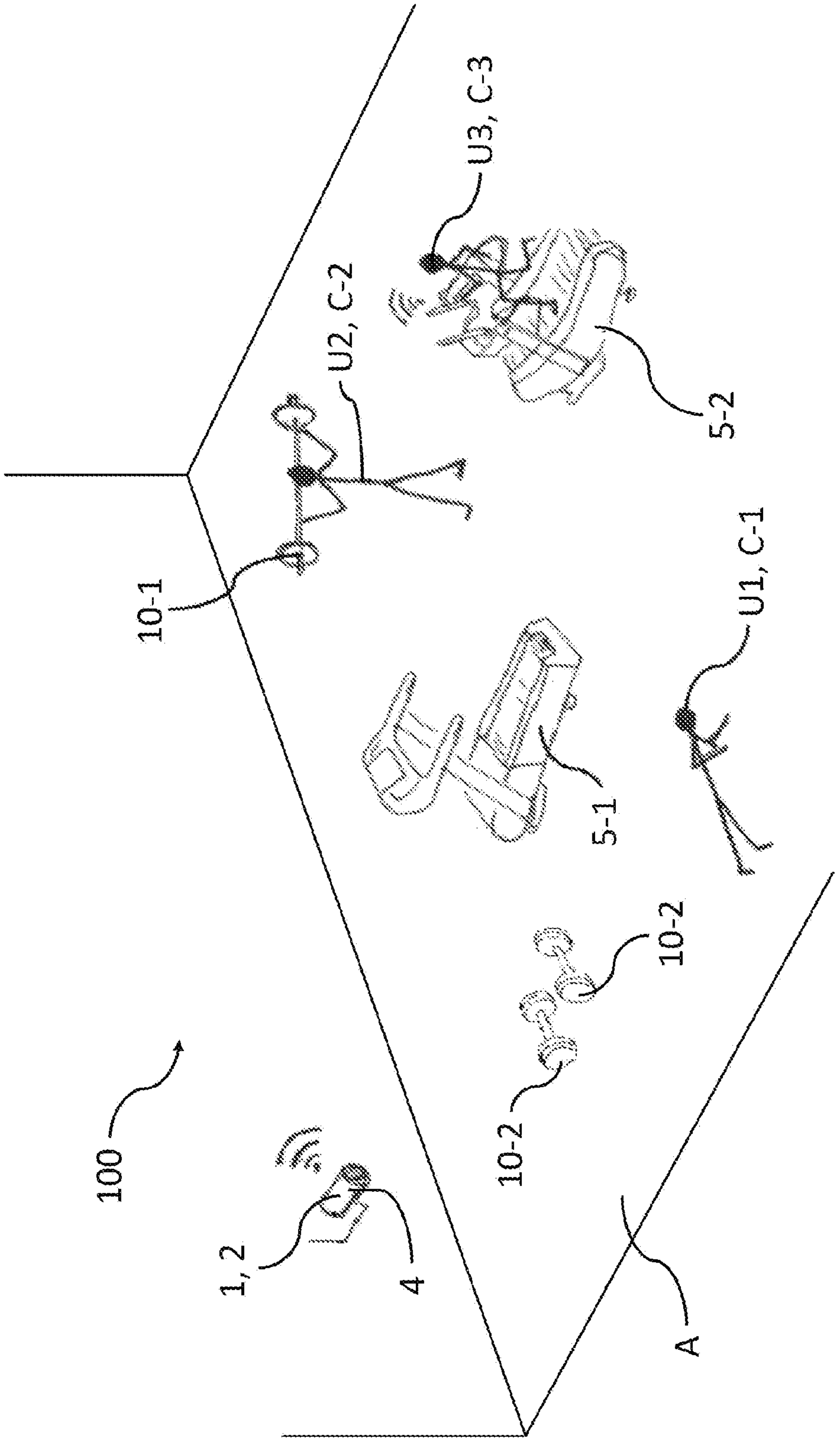

As shown in FIG. 4*c*, the first user U1 has moved to perform a bodyweight exercise, the second user U2 is still training with the first exercise tool 10-1 (barbell) and the third user U3 is still training on a second treadmill 5-2.

The at least one image acquisition device 4, following the first user U1 identified by the respective user code C-1 assigned, acquires images representative of the first user U1 while performing a bodyweight physical exercise in the training space A.

Again with reference to FIG. 4*c*, the at least one image acquisition device 4 continues to acquire images representative of the second user U2 and of the first exercise tool 10-1 (barbell) while performing a physical exercise performed by the second user U2 using the first exercise tool 10.

The at least one image acquisition device 4 continues to acquire images representative of the third user U3 and of the second treadmill 5-2 while performing a physical exercise performed by the third user U3 using the second treadmill 5-2.

The at least one central data processing unit 1 determines, for each user U1, U2 and U3, identification data of the user and training data of the user inside the training space A determined based on the images acquired by said at least one image acquisition device 4.

Figure 4D:
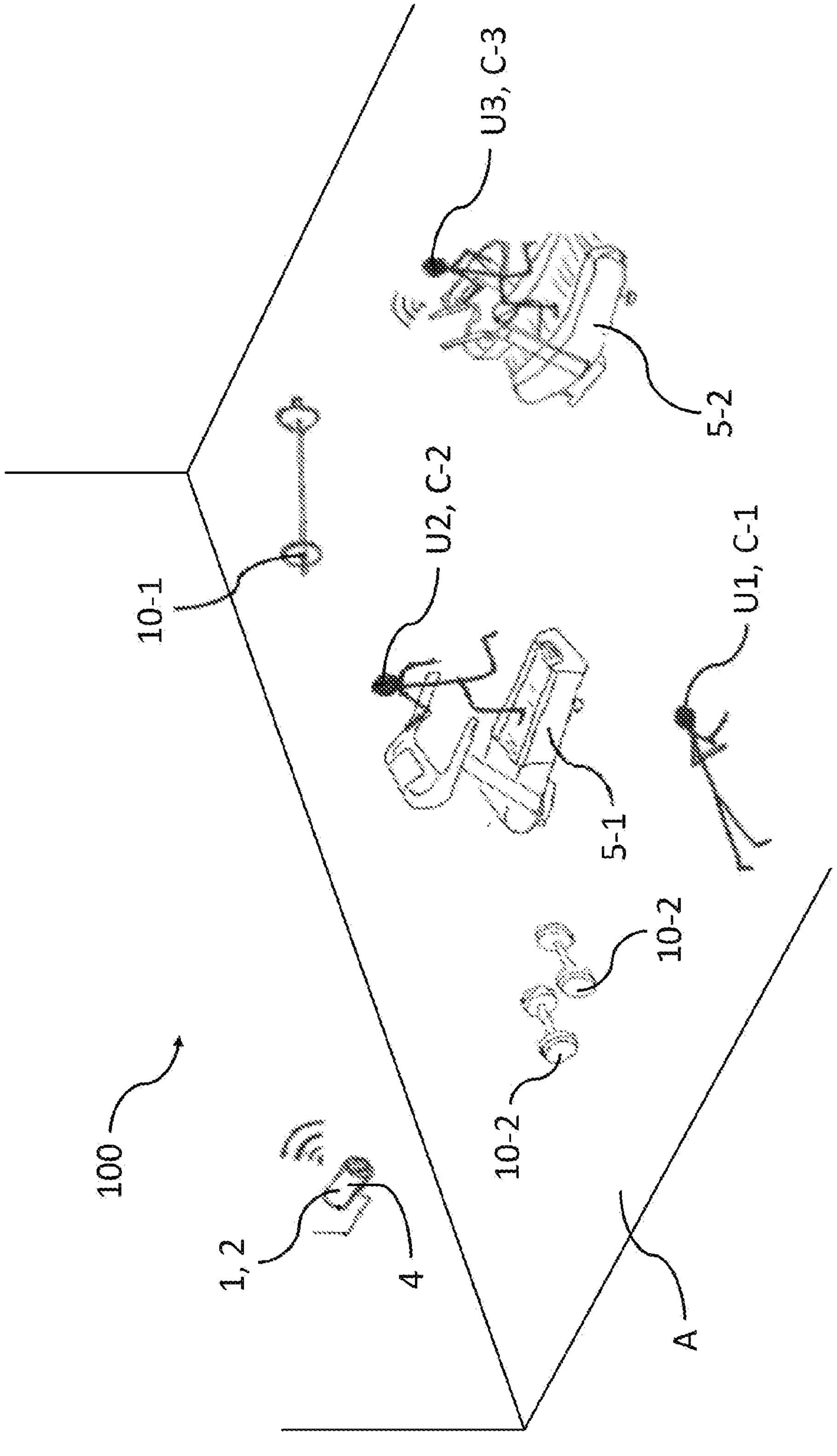

As shown in FIG. 4*d*, the first user U1 is still performing a bodyweight exercise, the second user U2 has moved from using the first exercise tool 10-1 to training on the first treadmill 5-1, the third user U3 is still training on a second treadmill 5-2.

The at least one image acquisition device 4, continues to acquire images representative of the first user U1 while performing a bodyweight physical exercise in the training space A.

Again with reference to FIG. 4*d*, following the second user U2 identified by the respective user code C-2 assigned, the at least one image acquisition device 4 acquires images representative of the second user U2 and of the first treadmill 5-1 while performing a physical exercise performed by the second user U2 using the first treadmill 5-1.

The at least one image acquisition device 4 continues to acquire images representative of the third user U3 and of the second treadmill 5-2 while performing a physical exercise performed by the third user U3 using the second treadmill 5-2.

The at least one central data processing unit 1 determines, for each user U1, U2 and U3, identification data of the user and training data of the user inside the training space A determined based on the images acquired by said at least one image acquisition device 4.

As it can be seen, the object of the invention is fully achieved.

In fact, the system and the related method of the present invention allow determining, and therefore tracking, and storing the user data and the data relating to the training performed by a user during any exercise performed by a user, whether on or with an exercise machine, a bodyweight exercise or using any other equipment available inside the same training space, so as to be able s to track and store user and user training data which are as complete as possible.

The system is capable of following the movements of the user inside the training space and of tracking the movements thereof (even when performing bodyweight exercises) and the movements of the exercise machines or of the exercise tools used by the user to continuously perform physical exercises, determining and storing constantly and in real time user data and the data relating to the training performed by a user during any exercise performed in the training space, be it a gym (indoor or outdoor gym) or a home space (indoor or outdoor space).

In order to meet contingent needs, those skilled in the art may make changes and adaptations to the embodiments of the system and the related method described above or can replace elements with others which are functionally equivalent without departing from the scope of the appended claims. Each of the features described as belonging to a possible embodiment can be achieved irrespective of the other embodiments described.

The invention claimed is:

1. A system for tracking and storing identification data of a user and respective data relating to training of the user in a training space, comprising:

at least one central data processing unit;

at least one central memory unit operatively connected to said at least one data processing unit;

at least one image acquisition device present inside the training space and operatively connected to the at least one central data processing unit, said at least one image acquisition device being configured to communicate data with the at least one central data processing unit;

at least one exercise machine present inside the training space, the at least one exercise machine being operatively connected to the at least one central data processing unit, the at least one exercise machine being configured to communicate data to the at least one central data processing unit, the at least one exercise machine comprising at least one actuator which is operable while performing the physical exercise;

at least one exercise tool present inside the training space, said at least one exercise tool being free from an actuator which is operable while performing a physical exercise;

said at least one image acquisition device being configured to acquire identification images of the user in the training space, images representative of the user while performing a bodyweight physical exercise in the training space, images representative of the user and of the at least one exercise machine while performing a physical exercise using said at least one exercise machine, images representative of the user and of the at least one exercise tool while performing a physical exercise performed by the user using said at least one exercise tool, the at least one central data processing unit being configured to track identification data of the user and training data of the user inside the training space based on the images acquired by said at least one image acquisition device comprising tracking movements of the users performing bodyweight exercises and movements of the at least one exercise machine or of the at least one exercise tool used by the user to continuously perform physical exercises, the at least one central data processing unit being configured to constantly and in real time store the tracked identification data of the user and training data of the user inside the training space in the at least one central memory unit of the system operatively connected to the at least one central data processing unit, the at least one central data processing unit being configured to establish, based on the images acquired by the at least one image acquisition device, whether the user is training on said at least one exercise machine, the at least one central data processing unit being configured to:

determine a start time for use of the at least one exercise machine based on analysis of the acquired images or based on an exercise start signal sent by the at least one exercise machine;

receive in real time, from the at least one exercise machine, operating data of the at least one exercise machine at set time intervals, said operating data being synchronized with data of the images acquired by comparing/aligning time stamps assigned along a time axis;

wherein the at least one central data processing unit is configured to assign the user an identification code of the user, the identification code of the user comprising the identification data of the user; and wherein the at least one central data processing unit is configured to assign the user the identification code of the user at a time of entry of the user into the training space, the at least one central data processing unit being configured to identify the user during his/her stay inside the training space by the assigned identification code of the user, the at least one central data processing unit being configured to associate the user identified by means of the assigned identification code of the user with the training data of the user while performing the training inside the training space.

2. The system according to claim 1, wherein the at least one central data processing unit is configured to establish, based on the images received from the at least one image acquisition device, whether the user is stationary inside the training space, whether the user is moving inside the training space, and/or whether the user is performing movements corresponding to set reference movement patterns stored in the at least one central memory unit.

3. The system according to claim 2, wherein the at least one central data processing unit is configured to:

determine a power expressed by the user while performing the physical exercise based on the identification images of the user, the amplitude and speed of execution of the movements performed by the user determined by processing the images acquired by the at least one image acquisition device and/or an energy expressed by the user while performing the physical exercise based on the identification images of the user while performing a physical exercise on said at least one exercise machine, with said at least one exercise tool and/or in a bodyweight physical exercise;

associate the determined expressed power and/or the determined expressed energy with the set reference movement patterns, if the movements performed by the user during the physical exercise correspond to said set reference movement patterns stored in the at least one central memory unit.

4. The system according to claim 2, wherein said set reference movement patterns performed by the user comprise movements of said at least one exercise tool moved by the user, the at least one central data processing unit being configured to:

determine a power expressed by the user and/or an energy expressed by the user which is a function of the identification images of the user and of said at least one exercise tool while performing a physical exercise;

associate the determined expressed power and/or the determined expressed energy with the set reference movement patterns, if the movements performed by the user during the physical exercise correspond to set reference movement patterns stored in the at least one central memory unit.

5. The system according to claim 2, wherein the set reference movement patterns stored in the at least one central memory unit comprise at least one of analysis of exercise quality, posture, or deviation with respect to a reference movement.

6. The system according to claim 1, wherein the at least one central data processing unit is configured to determine, from a processing of first identification images of the user acquired during an initial phase of identifying the user, a schematic reference model representative of the user, wherein the schematic reference model comprises a plurality of key elements to represent the user univocally, the at least one central data processing unit being configured to store the schematic reference model in the at least one central memory unit, the at least one central data processing unit being configured to generate the respective identification code of the user based on the processing.

7. The system according to claim 6, wherein the plurality of key elements comprises nodes and/or anatomical segments for uniquely representing the user.

8. The system according to claim 1, wherein the at least one image acquisition device is configured to provide the at least one central data processing unit with the acquired images.

9. The system according to claim 1, wherein the at least one central data processing unit is configured to recognize the user from the acquired identification images of the user, and use the assigned identification code of the user to determine the data of the user during the presence of the user inside the training space in association with the identification data of the user included in the identification code of the user.

10. The system according to claim 1, comprising a personal device wearable by the user, the at least one central data processing unit being configured to acquire the identification code of the user from the personal device wearable by the user.

11. The system according to claim 1, wherein the at least one central data processing unit is configured to recognize a face of the user from an identification image of the user acquired by the at least one image acquisition device, the at least one central data processing unit being configured to compare the identification image of the user acquired by the at least one image acquisition device with a schematic reference model stored in the at least one central memory unit.

12. The system according to claim 1, wherein the at least one central data processing unit is configured to determine information representative of the posture of and/or movements performed by the user from said images representative of the user while performing a physical exercise using said at least one exercise machine, from said images representative of a physical exercise performed by the user using said at least one exercise tool and from said images representative of a bodyweight physical exercise performed by the user.

13. The system according to claim 1, wherein the at least one central data processing unit is configured to associate the user, based on the acquired images, with the at least one exercise machine or the at least one exercise tool used by the user to perform the physical exercise as well as the respective training data of the user.

14. The system according to claim 1, wherein, when using the at least one exercise machine by the user, the at least one central data processing unit is configured to perform at least one or more of the following operations:

processing the images acquired by the user while performing the physical exercise;

comparing the processed images with set reference movement patterns for said at least one exercise machine;

recognizing an end time for use of the at least one exercise machine based on the analysis of the acquired images or based on an exercise end signal sent by the at least one exercise machine;

storing, in the at least one central memory unit, the data on the exercise performed on the at least one exercise machine;

calculating results of the training or providing a report on the exercise performed based on the operating data received from the at least one exercise machine and/or the acquired identification images of the user.

15. The system according to claim 1, wherein the at least one central data processing unit is configured to detect, from the images acquired by the at least one image acquisition device, a configuration of the at least one exercise tool.

16. The system according to claim 1, wherein the at least one image acquisition device is installed in the training space, on a wall in a home space, or on an exercise machine.

17. The system according to claim 1, wherein the at least one image acquisition device is integrated in a portable electronic device of the user or in an other electronic apparatus installed or present inside the training space or in the at least one exercise machine.

18. The system according to claim 1, wherein the at least one central data processing unit comprises one or more data processing modules distributed on one or more of said at least one image acquisition device and/or an electronic computer present inside the training space.

19. The system according to claim 1, wherein the at least one central data processing unit comprises one or more data processing modules distributed on one or more of said at least one image acquisition device and/or an electronic computer present inside the training space, the at least one central memory unit comprising one or more memory modules distributed on one or more of said at least one image acquisition device and/or said electronic computer present inside the training space and/or a remote electronic computer with respect to the training space.

20. The system for tracking and storing identification data according to claim 1, wherein said operating data comprises at least one of: slope/speed values for a treadmill, or resistance/level for a bike.

21. The system according to claim 1, the at least one central data processing unit being configured to receive in real time, from the at least one exercise machine, the operating data of the at least one exercise machine at the set time intervals with a set sampling frequency.

22. A method for tracking and storing identification data of a user and respective data relating to training of the user in a training space, comprising steps of:

acquiring, by at least one image acquisition device present inside the training space and operatively connected to at least one central data processing unit, identification images of the user in the training space, the at least one image acquisition device being configured to communicate data with the at least one central data processing unit;

acquiring, by the at least one image acquisition device, images representative of the user while performing a bodyweight physical exercise in the training space;

acquiring, by the at least one image acquisition device, images representative of the user and of at least one exercise machine present inside the training space, while performing a physical exercise using said at least one exercise machine, the at least one exercise machine being operatively connected to the at least one central data processing unit, the at least one exercise machine being configured to communicate data to the at least one central data processing unit, the at least one exercise machine comprising at least one actuator which is operable while performing the physical exercise;

acquiring, by the at least one image acquisition device, images representative of the user and of at least one exercise tool while performing a physical exercise performed by the user using said at least one exercise tool, the at least one exercise tool being free from an actuator which is operable while performing a physical exercise;

tracking, by the at least one central data processing unit, identification data of the user and training data of the user inside the training space based on the images acquired by said at least one image acquisition device;

the at least one central data processing unit being configured to continuously track the user as the user transitions between performing bodyweight exercises, using the at least one exercise machine, and using the at least one exercise tool within a single training session;

constantly storing, by the at least one central data processing unit, the tracked identification data of the user and training data of the user inside the training space in at least one central memory unit operatively connected to the at least one central data processing unit;

establishing by the at least one central data processing unit, based on the images acquired by the at least one image acquisition device, whether the user is training on said at least one exercise machine;

determining by the at least one central data processing unit, a start time for use of the at least one exercise machine based on analysis of the acquired images or based on an exercise start signal sent by the at least one exercise machine; and receiving in real time by the at least one central data processing unit, from the at least one exercise machine, operating data of the at least one exercise machine at set time intervals; said operating data being synchronized with data of the images acquired by comparing/aligning time stamps assigned along a time axis;

assigning by the at least one central data processing unit the user an identification code of the user, the identification code of the user comprising the identification data of the user, the identification code of the user being assigned to the user by the at least one central data processing unit at a time of entry of the user into the training space;

identifying by the at least one central data processing unit the user during his/her stay inside the training space by the assigned identification code of the user;

associating by the at least one central data processing unit the user identified by means of the assigned identification code of the user with the training data of the user while performing the training inside the training space.

23. The method for tracking and storing identification data according to claim 22, wherein said operating data comprises at least one of: slope/speed values for a treadmill, or resistance/level for a bike.

* * * * *